(12) United States Patent
Tamura et al.

(10) Patent No.: US 9,793,722 B2
(45) Date of Patent: Oct. 17, 2017

(54) POWER SOURCE APPARATUS FOR VEHICLE

(71) Applicant: DENSO CORPORATION, Kariya, Aichi-pref. (JP)

(72) Inventors: Hiroshi Tamura, Nagoya (JP); Teruhiko Kameoka, Okazaki (JP); Takao Suenaga, Oobu (JP); Atsushi Imai, Gamagoori (JP); Shigenori Saito, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 368 days.

(21) Appl. No.: 14/100,600

(22) Filed: Dec. 9, 2013

(65) Prior Publication Data

US 2014/0091767 A1    Apr. 3, 2014

Related U.S. Application Data

(62) Division of application No. 12/828,521, filed on Jul. 1, 2010, now abandoned.

(30) Foreign Application Priority Data

Jul. 1, 2009  (JP) .................................. 2009-156947
Sep. 29, 2009  (JP) .................................. 2009-223947

(51) Int. Cl.
*H02J 7/00*  (2006.01)
*H02J 1/10*  (2006.01)
(Continued)

(52) U.S. Cl.
CPC .............. *H02J 7/0003* (2013.01); *B60L 1/00* (2013.01); *B60L 3/0046* (2013.01); *B60L 7/12* (2013.01);
(Continued)

(58) Field of Classification Search
CPC ......................................................... H02J 1/10
(Continued)

(56) References Cited

U.S. PATENT DOCUMENTS 5,079,716 A  *  1/1992  Lenhardt ............... H02J 7/1453
                                                              320/153
5,111,788 A  *  5/1992  Washino ............... F02D 41/083
                                                              123/339.11

(Continued)

FOREIGN PATENT DOCUMENTS

CN         1864329 A    11/2006
EP       1 000 796 A2    5/2000
(Continued)

OTHER PUBLICATIONS

Oct. 18, 2012 Search Report issued in European Patent Application No. 10006719.8.

(Continued)

*Primary Examiner* — Adi Amrany
(74) *Attorney, Agent, or Firm* — Oliff PLC

(57) ABSTRACT

A power source apparatus mounted to a vehicle is equipped with a lead-acid battery and a lithium battery. An open circuit voltage and an internal resistance of each of the batteries are determined to satisfy the following conditions (a1), (a2), and (a3): (a1) In the use range of SOC of the lead-acid battery and the use range of SOC of the lithium battery, there is an equal voltage point Vds at which the open circuit voltage V0 (Pb) of the lead-acid battery becomes equal to the open circuit voltage V0 (Li) of the lithium battery; (a2) The relationship of V0 (Li)>V0 (Pb) is satisfied in the upper limit side of the use range of SOC of the battery; and (a3) A terminal voltage Vc (Li) of the lithium battery is not more than a set voltage Vreg of a regulator when a maximum current flows in the lithium battery.

8 Claims, 13 Drawing Sheets

CHARGE VOLTAGE INSTRUCTION SIGNAL

(51) Int. Cl.
*B60R 16/033* (2006.01)
*B60L 1/00* (2006.01)
*B60L 11/18* (2006.01)
*B60L 3/00* (2006.01)
*B60L 7/12* (2006.01)
*B60L 11/14* (2006.01)

(52) U.S. Cl.
CPC ........... *B60L 11/14* (2013.01); *B60L 11/1859* (2013.01); *B60L 11/1861* (2013.01); *B60L 11/1866* (2013.01); *B60L 11/1868* (2013.01); *B60R 16/033* (2013.01); *H02J 1/10* (2013.01); *B60L 2210/10* (2013.01); *B60L 2210/30* (2013.01); *B60L 2240/12* (2013.01); *B60L 2240/545* (2013.01); *B60L 2240/547* (2013.01); *B60L 2240/549* (2013.01); *Y02T 10/70* (2013.01); *Y02T 10/7011* (2013.01); *Y02T 10/7016* (2013.01); *Y02T 10/7044* (2013.01); *Y02T 10/7061* (2013.01); *Y02T 10/7066* (2013.01); *Y02T 10/7077* (2013.01); *Y02T 10/7216* (2013.01); *Y02T 10/7241* (2013.01)

(58) Field of Classification Search
USPC .......................................................... 307/9.1
See application file for complete search history.

(56) References Cited

U.S. PATENT DOCUMENTS

| | | | |
|---|---|---|---|
| 5,289,105 A * | 2/1994 | Boella | H02J 7/244 322/25 |
| 5,455,463 A | 10/1995 | Langnickel et al. | |
| 5,719,486 A * | 2/1998 | Taniguchi | H02J 7/1438 322/24 |
| 5,977,652 A | 11/1999 | Frey et al. | |
| 5,998,960 A | 12/1999 | Yamada et al. | |
| 6,321,707 B1 * | 11/2001 | Dunn | F02N 11/0866 123/179.3 |
| 6,353,306 B1 * | 3/2002 | Mixon | H02J 7/1453 320/137 |
| 6,404,163 B1 * | 6/2002 | Kapsokavathis | H02J 7/0029 320/104 |
| 6,731,021 B1 | 5/2004 | Urlass | |
| 6,765,312 B1 | 7/2004 | Urlass et al. | |
| 6,794,848 B2 | 9/2004 | Shinada et al. | |
| 6,844,634 B2 | 1/2005 | Kobayashi et al. | |
| 7,236,893 B2 | 6/2007 | Gross et al. | |
| 7,267,090 B2 | 9/2007 | Tamai et al. | |
| 7,477,038 B2 | 1/2009 | Taniguchi | |
| 7,533,746 B2 | 5/2009 | Yamaguchi | |
| 7,696,716 B2 | 4/2010 | Siddiqui et al. | |
| 2004/0164709 A1 * | 8/2004 | Kapsokavathis | H02J 7/1461 320/132 |
| 2004/0189254 A1 * | 9/2004 | Kapsokavathis | H02J 7/1469 320/132 |
| 2004/0201365 A1 | 10/2004 | Dasgupta et al. | |
| 2005/0287439 A1 * | 12/2005 | Shimamura | H01M 4/134 429/231.4 |
| 2006/0046143 A1 * | 3/2006 | Nakai | H01M 4/50 429/231.1 |
| 2007/0082265 A1 * | 4/2007 | Itou | H01M 4/131 429/223 |
| 2007/0138997 A1 * | 6/2007 | Lawahmeh | H02J 7/24 320/104 |
| 2007/0178376 A1 * | 8/2007 | Fujikawa | H01M 2/1653 429/144 |
| 2007/0231705 A1 | 10/2007 | Ohzuku et al. | |
| 2008/0124628 A1 * | 5/2008 | Inoue | H01M 4/0404 429/209 |
| 2008/0153005 A1 * | 6/2008 | Horikawa | H01M 10/052 429/314 |
| 2008/0199780 A1 * | 8/2008 | Hayata | C23C 14/226 429/231.95 |
| 2008/0241646 A1 * | 10/2008 | Sawa | H01M 4/622 429/94 |
| 2008/0286655 A1 * | 11/2008 | Inoue | H01M 4/136 429/231.95 |
| 2009/0053605 A1 * | 2/2009 | Harada | C01G 23/005 429/231.1 |
| 2009/0053609 A1 * | 2/2009 | Minami | H01M 4/13 429/232 |
| 2009/0067118 A1 * | 3/2009 | Yoshio | H01G 11/24 361/502 |
| 2009/0081558 A1 * | 3/2009 | Inagaki | C01G 23/002 429/337 |
| 2009/0117463 A1 * | 5/2009 | Takezawa | H01M 4/134 429/220 |
| 2009/0169986 A1 * | 7/2009 | Fukunaga | H01M 2/166 429/144 |
| 2009/0220863 A1 * | 9/2009 | Kimura | H01M 4/366 429/231.8 |
| 2009/0261796 A1 | 10/2009 | Ito et al. | |
| 2009/0286164 A1 * | 11/2009 | Wada | H01M 4/131 429/338 |
| 2009/0317696 A1 | 12/2009 | Chang | |
| 2010/0015509 A1 * | 1/2010 | Inagaki | H01M 4/485 429/93 |
| 2010/0035153 A1 * | 2/2010 | Thackeray | H01M 4/1395 429/219 |
| 2010/0086854 A1 * | 4/2010 | Kumar | H01M 4/505 429/223 |
| 2010/0173198 A1 * | 7/2010 | Zhamu | H01M 4/134 429/222 |
| 2012/0328949 A1 * | 12/2012 | Yamaguchi | H01M 4/505 429/224 |

FOREIGN PATENT DOCUMENTS

| | | |
|---|---|---|
| EP | 1 340 908 A1 | 9/2003 |
| JP | A-8-45558 | 2/1996 |
| JP | A-09-247850 | 9/1997 |
| JP | A-10-271611 | 10/1998 |
| JP | A-2003-134689 | 5/2003 |
| JP | A-2006-60883 | 3/2006 |
| JP | A-2007-46508 | 2/2007 |
| JP | A-2007-506395 | 3/2007 |
| JP | A-2007-131134 | 5/2007 |
| JP | A-2008-29058 | 2/2008 |
| JP | A-2008-155814 | 7/2008 |
| JP | A-2009-126395 | 6/2009 |
| WO | WO 2008/010062 A1 | 1/2008 |

OTHER PUBLICATIONS

May 14, 2013 Office Action issued in Japanese Patent Application No. 2009-156947 (with translation).
Dec. 5, 2012 Office Action issued in Chinese Application No. 201010256504.1 (with English translation).

* cited by examiner

CHARGE WITH REGENERATIVE POWER
Ic (Pb) < Ic (Li)

DISCHARGE UNDER IDOLING STOP CONTROL
Id (Pb) < Id (Li)

CHARGE VOLTAGE INSTRUCTION SIGNAL

CHARGE VOLTAGE INSTRUCTION SIGNAL

POWER SOURCE APPARATUS FOR VEHICLE

CROSS-REFERENCE TO RELATED APPLICATION

This application is a divisional of application Ser. No. 12/828,521 filed Jul. 1, 2010, and claims the benefit of Japanese Patent Application Nos. 2009-156947 filed on Jul. 1, 2009 and 2009-223947 filed on Sep. 29, 2009. The entire disclosures of the prior applications are hereby incorporated by reference herein in their entirety.

BACKGROUND OF THE INVENTION

1. Field of the Invention

The present invention relates to a power source apparatus to be applied to vehicles.

2. Description of the Related Art

A vehicle with an internal combustion engine generally has a lead-acid battery in order to supply electric power to various types of electrical loads such as a starter motor mounted on the vehicle. The lead-acid battery is cheap in cost when compared with high density energy batteries (high performance batteries) such as nickel batteries and lithium batteries, but has a low durability resistance to frequent charge and discharge. For example, because a lead-acid battery mounted on a vehicle with idle reduction function (which is a function to automatically stop idling to save and reduce fuel consumption) discharges electric power frequently, this causes a rapid deterioration of the lead-acid battery. In particular, a lead-acid battery mounted on a vehicle with an alternator capable of regenerating electric power when the vehicle decelerates is charged with such regenerative electric power frequently, this frequent charge would cause a rapid deterioration. Using a high performance battery to avoid the above drawback of the lead-acid battery would cause a large manufacturing cost.

Conventional techniques disclosed by the following technical documents D1 to D5 have proposed an improved structure where high performance batteries (as secondary battery) with high price and lead-acid battery with low price are mounted in parallel to a vehicle.

D1: Japanese patent laid open publication No. JP 2007-46508;
D2: Japanese patent laid open publication No. JP 2007-131134;
D3: Japanese patent laid open publication No. JP 2008-29058;
D4: Japanese patent laid open publication No. JP 2008-155814; and
D5: Japanese patent laid open publication No. JP 2009-126395.

That is, during idle reduction mode (which is capable to stop the engine during idling in order to reduce fuel consumption), electric power such as regenerative electric power is preferentially supplied to the high performance battery, and electric power of the high performance battery is preferentially supplied to the electrical loads. On the other hand, from the above viewpoint to reduce the electric power consumption while a vehicle stops in a car park for a long period of time, it is controlled so that the lead-acid battery supplies electric power to electrical loads. As described above, a combination of two types of batteries makes it possible to downsize the high performance battery, and to suppress the increase of the manufacturing cost.

By the way, overcharge or over discharge of a battery would cause a rapid deterioration. It is therefore preferable to use the battery within an optimum SOC (state of charge, hereinafter, will be referred to as the "the use range of SOC" or the "usable range of SOC") which is not overcharged or discharged, where the SOC indicates the charge state of the battery, because an open circuit voltage of the battery corresponds to SOC. In other words, the change of SOC of the battery has a different open circuit voltage of the battery. In general, the open circuit voltage (for example, 12.7 V to 12.8 V) of a lead-acid battery is not equal, within the use range of SOC, to an open circuit voltage of a high performance battery.

Because the lead-acid battery and the high performance battery are connected in parallel in a power source apparatus, a current flows from the battery with a high terminal voltage Vd to the battery with a low terminal voltage when discharging, and this would cause the batteries to be in an over discharged condition which is out from the use range of SOC. In general, the terminal voltage Vd of a battery can be expressed by the following formula (1):

$$Vd = V0 - Id \times R \qquad (1),$$

where Id is a discharging current of the battery, R is an internal resistance of the battery, and V0 is an open circuit voltage of the battery.

The conventional techniques disclosed by the technical documents D1 to D5 previously described have proposed a structure to use a DC/DC converter which is placed between those batteries such as a high performance battery and a lead-acid battery. This structure can adjust the terminal voltage of the high performance battery, which is higher in terminal voltage than that of the lead-acid battery, by the DC/DC converter, and prevent a current which flows from the high performance battery having a high terminal voltage to the lead-acid battery of a low terminal voltage in order to prevent the lead-acid battery from overcharge.

However, because such a DC/DC converter is a high price device, it is difficult to decrease the total manufacturing cost of a power source apparatus for vehicle which requires a DC/DC converter in order to prevent a lead-acid battery from overcharge.

SUMMARY OF THE INVENTION

It is an object of the present invention to provide a power source apparatus which is mounted to vehicles equipped with a high performance battery (or a high energy density battery which serves as a secondary battery) and a lead-acid battery, which is capable of suppressing deterioration of the lead-acid battery and reducing its manufacturing cost without incorporating any DC/DC converter.

In accordance with a first aspect of the present invention, there is provided a power source apparatus which is applied to various types of vehicles with an alternator and a constant voltage control means. The constant voltage control means is capable of adjusting a voltage of the electric power supplied from the alternator to a set voltage. The power source apparatus is comprised of a lead-acid battery and a secondary battery. The lead-acid battery is electrically connected to an alternator. The secondary battery is electrically connected in parallel to the lead-acid battery. The secondary battery is higher in output power density and energy density than the lead-acid battery.

In the power source apparatus according to the first aspect of the present invention, an open circuit voltage and an internal resistance of the lead-acid battery and an open circuit voltage and an internal resistance of the secondary battery are determined in order to satisfy the following conditions (a), (b), and (c):

(a) an equal voltage point at which the open circuit voltage of the lead-acid battery becomes equal to the open circuit voltage of the secondary battery is present in a use range of state of charge (SOC) of the lead-acid battery and a use range of SOC of the secondary battery;

(b) the open circuit voltage of the secondary battery is higher than the open circuit voltage of the lead-acid battery at an upper limit side from the equal voltage point in the use range of SOC of the secondary battery; and (c) a terminal voltage of the secondary battery when a maximum charging current flows in the secondary battery is less than the set voltage which is set by the constant voltage control means.

In the power source apparatus according to the present invention, the open circuit voltages and the internal resistance of the lead-acid battery and the secondary battery (such as a lithium battery) are determined in order to satisfy the above condition (a). This allows that the terminal voltage Vd (Pd) within the use range of SOC of the lead-acid battery is approximately equal to the terminal voltage Vd (Li) within the use range of SOC of the lithium battery, and this makes it possible to have a small difference between or a same voltage potential between the lead-acid battery and the secondary battery. Accordingly, this allows the secondary battery to flow a very small current to the lead-acid battery without using any DC/DC converter in the power source apparatus, and it is thereby possible to prevent the lead-acid battery from overcharge. It is therefore possible to produce the power source apparatus with low manufacturing cost because of not using any DC/DC converter.

In the power source apparatus according to the present invention, the open circuit voltages and the internal resistance of the lead-acid battery and the secondary battery are determined in order to satisfy the above condition (b). This allows the lead-acid battery to discharge because the secondary battery is higher in open circuit voltage than the lead-acid battery when the secondary battery is charged with an electric capacity which is higher than that at the equal voltage point within the use range of SOC of the secondary battery. This allows the secondary battery to preferentially discharge rather than the lead-acid battery. Because the lead-acid battery has a low durability to the frequent discharge operation and the frequency of discharge from the lead-acid battery is decreased, the structure of the power source apparatus according to the present invention can prevent the lead-acid battery from deterioration in charging capacity and performance.

In the power source apparatus according to the first aspect of the present invention, the open circuit voltages and the internal resistance of the lead-acid battery and the secondary battery are determined in order to satisfy the above condition (c). This can increase the frequency of preferentially charging the secondary battery rather than the lead-acid battery by the following reasons.

That is, because the terminal voltage Vc (Pb) (expressed by the following formula (F2)) of an available lead-acid battery when the maximum charging current flows becomes larger than the set voltage which is set by the constant voltage control means, it would become difficult to charge the lead-acid battery when the maximum charging current flows.

Even when the lead-acid battery has a less residual capacity and the terminal voltage Vc (Pb) of the lead-acid battery is lower than the set voltage, the terminal voltage Vc (Pb) of the lead-acid battery is rapidly increased and it would becomes difficult to charge the lead-acid battery because the lead-acid battery has a large internal resistance value R (Pb) when the lead-acid battery is charged. This would be difficult to charge the lead-acid battery. The terminal voltage Vc of a battery during charge is expressed by F2:

$$Vc = V0 + Ic \times R \quad (F2),$$

where Ic is a charge current, R is an internal resistance of the battery, and V0 is an open circuit voltage of the battery.

On the other hand, in the power source apparatus according to the first aspect of the present invention, the terminal voltage Vc (Li) of the secondary battery when the maximum charging current flows in the secondary battery is set to a voltage which is lower than the set voltage. In other words, because the terminal voltage of the secondary battery is always below the set voltage even when the terminal voltage Vc (Li) has the maximum voltage as the upper limit in the use range of SOC of the secondary battery, it is possible to always charge the secondary battery. Accordingly, this makes it possible to increase the frequency of preferentially charging the secondary battery rather than the lead-acid battery. Because the frequency of discharge from the lead-acid battery can be decreased and the lead-acid battery has a low durability to the frequent discharge operation, it is possible to suppress the deterioration of the lead-acid battery.

In accordance with a second aspect of the present invention, there is provided a power source apparatus for vehicle, which is applied to various types of vehicles with an alternator and a constant voltage control means. The constant voltage control means is capable of adjusting a voltage of electric power generated by the alternator to a set voltage. The power source apparatus has a lead-acid battery and a secondary battery, and a rectifying means. The lead-acid battery is electrically connected to the alternator. The secondary battery is electrically connected in parallel to the lead-acid battery. The secondary battery is higher in output density or energy density than the lead-acid battery. The rectifying means is placed between the lead-acid battery and the secondary battery so that a forward current direction of the rectifying means has a direction from the lead-acid battery to the secondary battery. The rectifying means has a barrier voltage therein to the current which flows in the forward direction through the rectifying means. In the power source apparatus, an open circuit voltage and an internal resistance of the lead-acid battery and an open circuit voltage and an internal resistance of the secondary battery are determined in order to satisfy following conditions (a'), (b'), and (c'):

(a') an equal voltage point is present in a use range of state of charge (SOC) of the lead-acid battery and a use range of SOC of the secondary battery, where at the equal voltage point, the open circuit voltage of the secondary battery becomes equal to a subtracted voltage which is obtained by subtracting the barrier voltage of the rectifying means from the open circuit voltage of the lead-acid battery;

(b') the open circuit voltage of the secondary battery is higher than the subtracted voltage of the lead-acid battery at an upper limit side from the equal voltage point in the use range of SOC of the secondary battery; and (c') a terminal voltage of the secondary battery when a maximum charging current flows in the secondary battery is not more than the set voltage, where the set voltage is set by the constant voltage control means.

A description will now be given of the above effects (a'), (b'), and (c'), and the technical feature for the power source apparatus according to the second aspect of the present invention equipped with the rectifying means.

In the power source apparatus according to second aspect of the present invention, the open circuit voltages and the internal resistance of the lead-acid battery and the secondary battery are determined in order to satisfy the above condition (a').

This allows that the terminal voltage Vd (Pd) (in more detail, the subtract voltage obtained by subtracting the barrier voltage from the terminal voltage Vd (Pb) when discharging to the electric load placed in position at the secondary battery side observed from the rectifying means) within the use range of SOC of the lead-acid battery becomes approximately equal to the terminal voltage Vd (Li) within the use range of SOC of the lithium battery. That is, this makes it possible to have a small difference in voltage between the lead-acid battery and the secondary battery, or a same voltage potential between the lead-acid battery and the secondary battery. Accordingly, this allows the battery having a high voltage to flow a very small current to another battery having a low voltage without using any DC/DC converter in the power source apparatus, and it is thereby possible to prevent each of those batteries from overcharge and over discharge. It is therefore possible to decrease the manufacturing cost of the power source apparatus because of not using any DC/DC converter.

In the power source apparatus according to the second aspect of the present invention, the open circuit voltages and the internal resistance of the lead-acid battery and the secondary battery are determined in order to satisfy the above condition (b'). This allows for the secondary battery having a high open circuit voltage to discharge because the open circuit voltage V0 (Li) of the secondary battery is higher than the subtracted voltage which is obtained by subtracting the barrier voltage from the open circuit voltage V0 (Pb) of the lead-acid battery when the secondary battery is more charged rather than the charged capacity at the equal voltage point within the use range of SOC of the secondary battery. This makes it possible to increase the frequency of preferentially discharge from the secondary battery rather than the lead-acid battery. Because the frequency of discharging from the lead-acid battery can be decreased, and the lead-acid battery has a low durability to the frequent discharge operation, the feature of the present invention can prevent the lead-acid battery from deterioration.

In the power source apparatus according to the second aspect of the present invention, the open circuit voltages and the internal resistance of the lead-acid battery and the secondary battery are determined in order to satisfy the above condition (c'). This can increase the frequency of preferentially charging the secondary battery rather than the lead-acid battery by the following reasons.

That is, because the terminal voltage Vc (Pb) (expressed by the following formula (F2)) of an available lead-acid battery is larger than the set voltage which is set by the constant voltage control means when the maximum charging current flows, it would become impossible to charge the lead-acid battery when the maximum charging current flows.

Even when the lead-acid battery has a less residual capacity and the terminal voltage Vc (Pb) of the lead-acid battery is lower than the set voltage, because the lead-acid battery has a large internal resistance value R (Pb) when the lead-acid battery is charged, the terminal voltage Vc (Pb) of the lead-acid battery is rapidly increased rather than the set voltage. This would be difficult to charge the lead-acid battery.

The terminal voltage Vc of a battery during charging is expressed by the following formula (F2):

$$Vc = V0 + Ic \times R \quad (F2),$$

where Ic is a charge current, R is an internal resistance of the battery, and V0 is an open circuit voltage of the battery.

On the other hand, in the power source apparatus according to the second aspect of the present invention, like the first aspect of the present invention, previously described, the terminal voltage Vc (Li) of the secondary battery, when the maximum charging current flows in the secondary battery, is set to a voltage which is lower than the set voltage. In other words, because the terminal voltage of the secondary battery is always below the set voltage even when the terminal voltage Vc (Li) has the maximum voltage in the use range of SOC of the secondary battery, it is possible to always charge the secondary battery. Accordingly, this makes it possible to increase the frequency of preferentially charging the secondary battery rather than the lead-acid battery. Because the frequency of discharging from the lead-acid battery is decreased and the lead-acid battery has a low durability to the frequent discharge operation, the present invention can prevent the lead-acid battery from deterioration.

The horizontal line in FIG. 12B designates the SOC of the lithium battery 30 (secondary battery), the solid line A2 in FIG. 12B denotes a voltage characteristic line which shows a relationship between the SOC and the open circuit voltage V0 (Li) of the lithium battery 30. The solid line A1 in FIG. 12B denotes a voltage characteristic line which shows a relationship between the SOC and the open circuit voltage V0 (Pb) of the lead-acid battery 20. In FIG. 13B, the position at 0% in the horizontal line showing the SOC of the lithium battery corresponds to the point at 88% of SOC of the lead-acid battery.

The reference character Vds shown in FIG. 12B indicates the equal voltage point at which the open circuit voltages of the lithium battery (secondary battery) and the lead-acid battery are equal together when the power source apparatus without any rectifying means, which is different from the structure of the power source apparatus of the present invention with the rectifying means. Because the terminal voltage Vd (Pb) of the lead-acid battery is higher than the open circuit voltage Vd (Li) of the secondary battery at the lower limit side from the equal voltage point in the use range W2 (Li) of SOC of the lithium battery (secondary battery), the lead-acid battery discharges its electric power, and the secondary battery does not discharge. Accordingly, it is sufficient to shift the equal voltage point Vds toward the lower limit side in the use range W2 (Li) of SOC of the lithium battery (secondary battery) in order to increase the frequency of preferentially discharging from the secondary battery rather than from the lead-acid battery.

In the above viewpoint, the power source apparatus according to the second aspect of the present invention is equipped with the rectifying means (which is composed of a diode, for example) in order to shift the equal voltage point toward the lower limit side (Vds--->Vds') by the barrier voltage Vbar, where at the equal voltage point, the open circuit voltage of the secondary battery becomes equal to the open circuit voltage of the lead-acid battery.

In other words, the voltage characteristic line A1 of the lead-acid battery is apparently shifted toward the lower limit side as expressed by the long and dash line shown in FIG. 12B. This can expand the upper area by the area W2d' toward the upper limit side from the equal voltage point Vds in the use range W2 (Li) of SOC of the lithium battery (secondary battery). This can increase the opportunity for the lithium battery to preferentially discharge rather than from the lead-acid battery.

The starter motor requires a larger electric power than other electric loads mounted to vehicles when the starter motor starts to operate. Supplying such a large electric power from the secondary battery to the starter motor prevents the secondary battery from being downsized because the secondary battery is in general a higher price device than the lead-acid battery. Accordingly, it is preferable for the lead-acid battery instead of the lithium battery (secondary battery) to supply such a large electric power to the starter motor of a large power consumption.

In the above viewpoint, the power source apparatus according to the second aspect of the present invention has the rectifying means (such as a diode, for example) which is placed so that the forward current direction in the rectifying direction becomes the direction from the lead-acid battery to the secondary battery. Accordingly, when the power source apparatus has the structure in which the electric load (such as a starter motor) is electrically connected with a node in the lead-acid battery side which is opposite from the secondary battery side observed from the rectifying means, it is possible for the rectifying means to prevent the current supplied from the secondary battery to the electric load such as a starter motor which requires a large electric power.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1A:
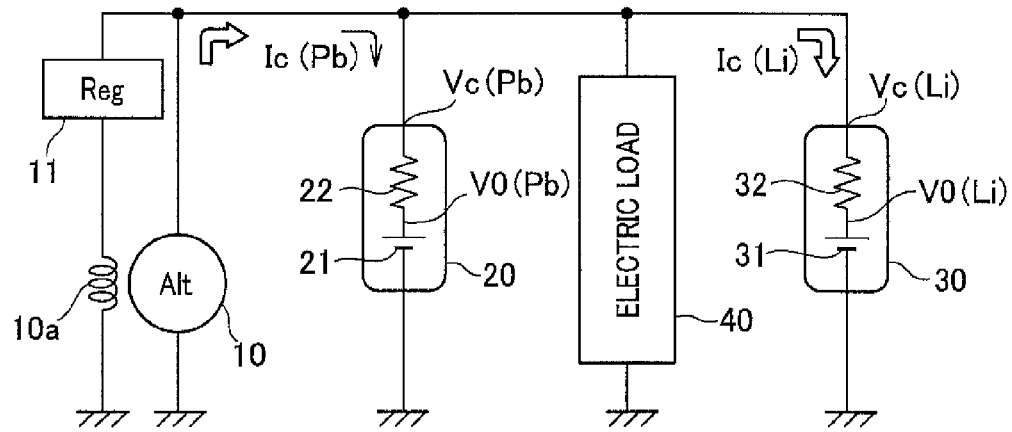
FIG. 1A and FIG. 1B are block diagrams showing a schematic electric circuit of a power source apparatus for vehicles according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will now be given of the power source apparatus for vehicle according to the first embodiment of the present invention with reference to FIG. 1A, FIG. 1B, FIG. 2A, FIG. 2B, FIG. 3, FIG. 4A, and FIG. 4B.

The power source apparatus according to the first embodiment can be applied to vehicles with an internal combustion engine. For example, the power source apparatus according to the first embodiment can be applied to various types of vehicles equipped with an idle reduction apparatus. The idle reduction apparatus automatically stops the operation of the internal combustion engine when a predetermined engine stop condition is satisfied, and then automatically restarts the internal combustion engine when a predetermined engine restart condition is satisfied. The idling reduction apparatus will be referred to as the "idle stop apparatus or idle stop function" through the following explanation.

Figure 1B:
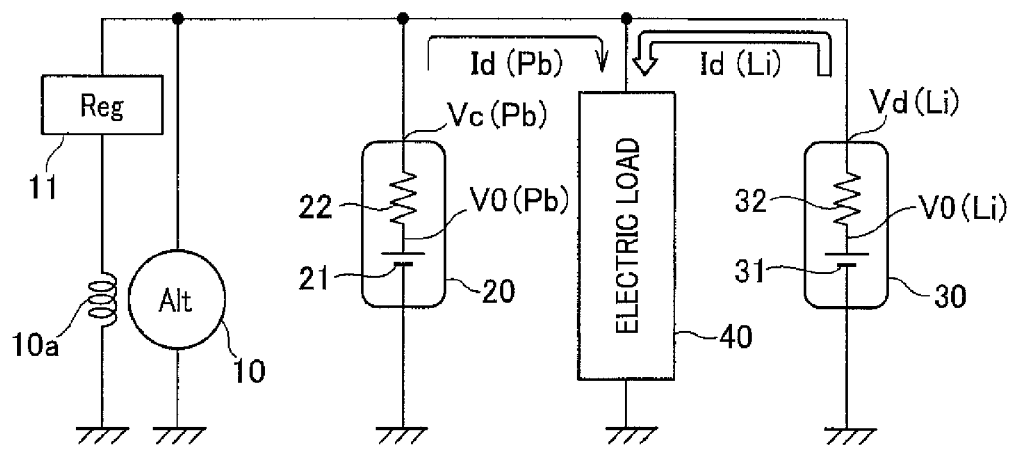

The vehicle equipped with the power source apparatus according to the first embodiment has a starter motor to rotate a crank shaft of the internal combustion engine when the internal combustion engine starts to operate. However, the vehicle in the first embodiment does not mount any driving motor capable of assisting the vehicle to drive FIG. 1A and FIG. 1B are block diagrams showing a schematic electric circuit of the power source apparatus according to the first embodiment. As shown in FIGS. 1A and 1B, an alternator 10 (electric generator), a regulator 11 (constant voltage control means), a lead-acid battery 20, a lithium battery 30 (secondary battery), and electrical loads 40 such as a starter motor. The lead-acid battery 20, the lithium battery 30, and the electrical loads 40 are electrically connected in parallel to the alternator 10.

The alternator 10 generates electric power when receiving a rotary energy transmitted through the crank shaft of the internal combustion engine. Specifically, the rotor of the alternator 10 engages with the crank shaft. Rotation of the rotor of the alternator 10 when receiving the rotary energy of the crank shaft generates an exciting current in a rotor coil 10a of the alternator 10. The exciting current then flows in the rotor coil 10a. An alternating current is induced in a stator coil of the alternator 10 according to the magnitude of the exciting current. A rectifier (not shown) rectifies the induced alternating current to a direct current. The regulator 11 adjusts the magnitude of the rectified current which is flowing through the rotor coil 10a so as to control a voltage of the alternator 10 generated by the induced current to be constant (a constant voltage Vreg). This makes it possible to suppress fluctuation of the output voltage of the alternator 10. In the first embodiment, the constant voltage Vreg is 14.5 V.

The electric power generated in the alternator 10 is supplied to the electrical loads 40, and also supplied to the lead-acid battery 20 and the lithium battery 30. During the operation not to generate any electric power by the alternator 10 when the internal combustion engine stops, the lead-acid battery 20 and the lithium battery 30 supply the electric power to the electrical loads 40. The power source apparatus according to the first embodiment is equipped with a protection control means (not shown). This protection control means controls a discharge capacity and a charge capacity so as to keep the electric energy of the battery within the use range of SOC (state of charge) of each battery such as the lead-acid battery 20 and the lithium battery 30. The SOC is a residual capacity or energy in the battery. By the way, the SOC is a ratio of a charged energy to a full charged energy of the battery, the above discharged capacity is the electric energy supplied from the lead-acid battery 20 and the lithium battery 30 to the electrical loads 40, and the above charged capacity is the electric energy supplied from the alternator 10 to the lead-acid battery 20 and the lithium battery 30.

In the first embodiment, the alternator 10 generates the electric power by the regenerative energy of the vehicle which is generated when the vehicle speed is decreased. The regenerative electric power is charged to the lead-acid battery 20 and the lithium battery 30 (mainly charged to the lithium battery 30). Such regenerative electric power is obtained only when the vehicle speed is increased, for example, when the vehicle runs downhill, and a fuel injection to the internal combustion engine is stopped.

The lead-acid battery 20 is a known usual battery. Specifically, the lead-acid battery 20 is composed of a plurality of cells connected in series and an electrolytic solution. Each of the cells in the lead-acid battery 20 has a positive electrode, and a negative electrode. Lead dioxide ($PbO_2$) is used as the positive electrode active material, lead (Pb) is used as the negative electrode active material, and sulfuric acid ($H_2SO_4$) is used as the electrolytic solution. In general, the lead-acid battery 20 is larger in charge capacity than the lithium battery 30.

On the other hand, the lithium battery 30 uses oxide which contains lithium (for example, lithium metal composite oxide) as the positive electrode active material and/or adsorbent material (for example, activated carbon) as the positive electrode. Specifically, $LiCoO_2$, $LiMn_2O_4$, $LiNiO_2$, $LiFePO_4$, etc. are used as the positive electrode active material. In addition, the lithium battery 30 uses carbon, graphite, lithium-doped carbon or graphite, lithium titanium oxide ($Li_2TiO_2$) or alloy which contains Si or Sn as the negative electrode active material. The lithium battery 30 contains an organic electrolyte as electrolytic solution. Like the structure of the lead-acid battery 20, the lithium battery 30 is composed of a plurality of cells having the above electrodes connected in series.

In FIG. 1A, and FIG. 1B, reference numbers 21 and 31 designate a battery cell assembly of the lead-acid battery 20 and a battery cell assembly of the lithium battery 30, respectively, and reference numbers 22 and 32 denote an internal resistance of the lead-acid battery 20 and the lithium battery 30, respectively.

In the following explanation, an open circuit voltage V0 of the battery is a voltage generated by the battery cell assemblies 21 and 31. The terminal voltages Vd and Vc of the battery are voltages expressed by the following equation:

$$Vd = V0 - Id \times R \quad \text{(F1); and}$$

$$Vc = V0 + Ic \times R \quad \text{(F2),}$$

where Id is a discharge current, Ic is a charge current, R is an internal resistance of the battery, and V0 is an open circuit voltage of the battery.

An exciting current of the alternator 10 is flowing to the battery having a low terminal voltage Vc when each of the lead-acid battery 20 and the lithium battery 30 is charged by the current generated by the alternator 10 because the lead-acid battery 20 and the lithium battery 30 are connected in parallel. On the other hand, the battery having a high terminal voltage Vd charges a current to the electrical loads 40 when the electric power is supplied to the electrical loads 40.

During the regenerative mode of the vehicle, it is controlled for the terminal voltage Vd (Li) of the lithium battery 30 to become many times lower than the terminal voltage Vd (Pb) of the lead-acid battery 20 in order to preferentially charge the lithium battery 30 rather than the lead-acid battery 20. In addition, during the discharging mode, it is also controlled for the terminal voltage Vd (Li) of the lithium battery 30 to become many times higher than the terminal of the lead-acid battery 20 in order to preferentially discharge the electric energy from the lithium battery 30 rather than the lead-acid battery 20.

The above control can be achieved by adjusting the open circuit voltage V0 and the internal resistance R of each of the lead-acid battery 20 and the lithium battery 30. That is, the open circuit voltage V0 of the battery can be adjusted by selecting an optimum positive electrode active material, an optimum negative electrode active material, and an optimum electrolytic solution of the lithium battery 30.

A description will now be given of the method of setting the condition to satisfy the relationship of Vc (Li: Lithium battery)<Vc (Pb: lead-acid battery) during a regenerative generation and the condition to satisfy the relationship of Vd (Li)>Vd (Pb) during discharge, in the power source apparatus according to the first embodiment with reference to FIG. 2A, FIG. 2B, and FIG. 3.

Figure 2A:
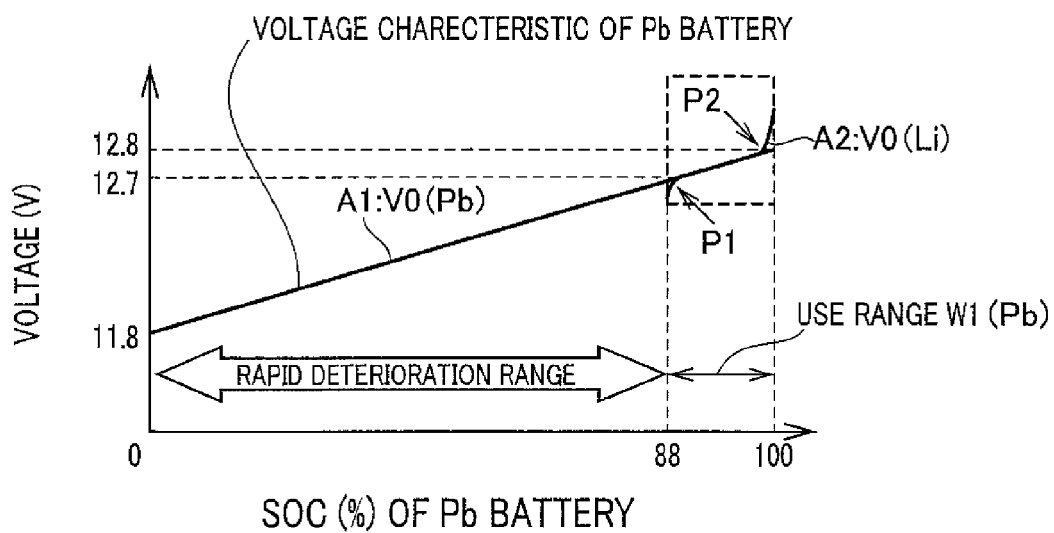
FIG. 2A is a view showing a use range of SOC of a lead-acid battery mounted to a vehicle with the power source apparatus according to the first embodiment of the present invention.
Figure 2B:
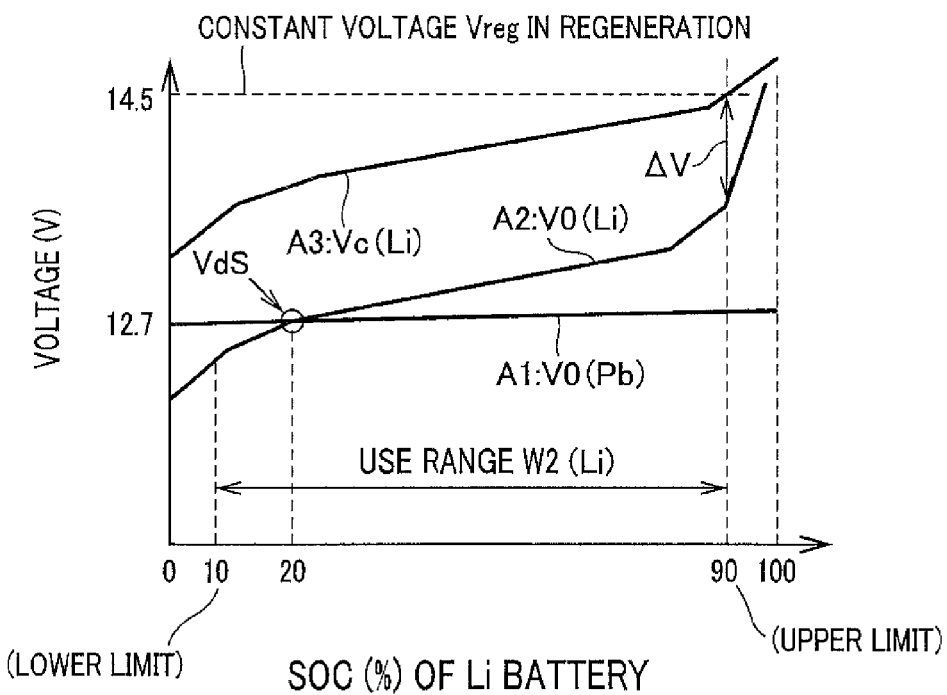
FIG. 2B is a view showing a use range of SOC of a lithium battery (secondary battery) mounted to the vehicle with the power source apparatus according to the first embodiment of the present invention.

FIG. 2A is a view showing the use range of SOC of the lead-acid battery 20 mounted to the vehicle with the power source apparatus according to the first embodiment. FIG. 2B is a view showing the use range of SOC of the lithium battery 30 in the power source apparatus according to the first embodiment.

In FIG. 2A, the horizontal line designates the SOC of the lead-acid battery 20, the solid line A1 denotes a voltage characteristic line which shows a relationship between the SOC and the open circuit voltage V0 (Pb) of the lead-acid battery 20. As shown in FIG. 2A, the more the SOC increases by increasing the charged energy, the more the open circuit voltage V0 (Pb) increases.

In FIG. 2B, the horizontal line designates the SOC of the lithium battery 30, the solid line A2 denotes a voltage characteristic line which shows a relationship between the SOC and the open circuit voltage V0 (Li) of the lithium battery 30. The more the SOC increases by increasing the charged energy, the more the open circuit voltage V0 (Li) increases. In particular, although the SOC increases according to the increase of the charged energy, the slope which shows the voltage characteristic line of the lead-acid battery 20 becomes low during a range between inflection points P1 and P2 shown in FIG. 2A.

The overcharge state and the over discharge state of each of the lead-acid battery 20 and the lithium battery 30 would cause a rapid deterioration. Accordingly, it is necessary for the protection control means, previously described, to control the charging capacity to the lithium battery 30 and the lead-acid battery 20, and the discharging capacity from the lead-acid battery 20 and the lithium battery 30. That is, it is necessary to use each of the lead-acid battery 20 and the lithium battery 30 within the use range of SOC.

The use range W1 (Pb) of SOC of the lead-acid battery 20 is within the range of 88% to 100% of SOC. On the other hand, the use range W2 (Li) of SOC of the lithium battery 30 is within the range of 10% to 90% of SOC. The upper limit of the use range W2 (Li) of SOC of the lithium battery 30 is smaller than 100%, and the lower limit of the use range W2 (Li) of SOC of the lithium battery 30 is larger than zero %.

Accordingly, the range of 0% to 88% of SOC of the lead-acid battery 20 causes the rapid deterioration. FIG. 2B also shows an expansion of the area indicated by the dotted line shown in FIG. 2A which indicates the use range W1 (Pb) of SOC of the lead-acid battery 20. The position of 0% of SOC of the lithium battery 30 indicated by the horizontal line in FIG. 2B corresponds to the position of 88% of the use range W1 (Pb) of SOC of the lead-acid battery 20.

The lithium battery 30 is set in order to obtain the voltage characteristic A2 of the lithium battery 30 which satisfies the following conditions (a), (b), (c), (d), and (e). Specifically, it is possible to obtain the voltage characteristic A2 which satisfies the conditions (a), (b), (c), (d), and (e) by selecting an optimum combination of the positive electrode active material, the negative electrode active material, and the solid electrolyte of the lithium battery 30.

<Condition (a)>

There is an equal voltage point Vds at which the open circuit voltage V0 (Pb) of the lead-acid battery 20 is equal to the open circuit voltage V0 (Li) of the lithium battery 30 in the use range W1 (Pb) of SOC of the lead-acid battery 20 and the use range W2 (Li) of SOC of the lithium battery 30. This equal voltage point Vds is present in the range of the inflection points P1 and P2, where a slope of voltage characteristic line A2 of the lithium battery 30 in this range is small.

<Condition (b)>

The open circuit voltage V0 (Li) of the lithium battery 30 is higher than the open circuit voltage V0 (Pb) of the lead-acid battery 20 at the upper limit side of the equal voltage point Vds in the use range W2 (Li) of SOC of the lithium battery 30. In more detail, the equal voltage point Vds is present at the lower limit side rather than the upper limit side (90%) of the use range W2 (Li) of SOC of the lithium battery 30 in order to set the equal voltage point Vds within the range of P1 and P2. The slope of the voltage characteristic line A2 of the lithium battery 30 is larger than the slope of the voltage characteristic line A1 of the lead-acid battery 20 at the upper limit side of the equal voltage point Vds in the use range W2 (Li) of SOC of the lithium battery 30.

<Condition (c)>

The terminal voltage Vc (Li) of the lithium battery 30 when the maximum charging current flows in the lithium battery 30 is smaller than the constant voltage Vreg which is controlled by the regulator 11. In other words, the terminal voltage Vc (Li) of the lithium battery 30 is smaller than the constant voltage Vreg, which is the terminal voltage Vc (Li) (see the solid line A3 shown in FIG. 2B) when the lithium battery 30 is charged at the upper limit value (90%) of the use range W2 (Li) of SOC of the lithium battery 30.

Reference character $\Delta V$ shown in FIG. 2B indicates a voltage drop part by the internal resistance 32 at the upper limit value (90%), which corresponds to the term (Ic×R) in the equation (F2), previously described.

<Condition (d)>

The open circuit voltage V0 (Li) of the lithium battery 30 is lower than the open circuit voltage V0 (Pb) of the lead-acid battery 20 in the lower limit side from the equal voltage point Vds in the use range W2 (Li) of SOC of the lithium battery 30. In more detail, the equal voltage point Vds is set to a value at the upper limit side from the lower limit side (10%) of the use range W2 (Li) of SOC of the lithium battery 30 in order to set the equal voltage point Vds in the range of P1 to P2.

In the range in the lower limit side observed from the equal voltage point Vds in the use range W2 (Li) of SOC of the lithium battery 30, the slope of the voltage characteristic line A2 of the lithium battery 30 is larger than the slope of the voltage characteristic line A1 of the lead-acid battery 20.

<Condition (e)>

The range in the upper limit side observed from the equal voltage point Vds is wider than the range in the lower limit side observed from the equal voltage point Vds in the use range W2 (Li) of SOC of the lithium battery 30. In more detail, the equal voltage point Vds is set to a value in the lower limit side observed from the intermediate point between the range of P1 and p2 in order to set the equal voltage point Vds in the range of P1 to P2. This satisfies the relationship of Vd (Li)>Vd (Pb) in a large part in the use range W2 (Li) of SOC of the lithium battery 30.

Figure 3:
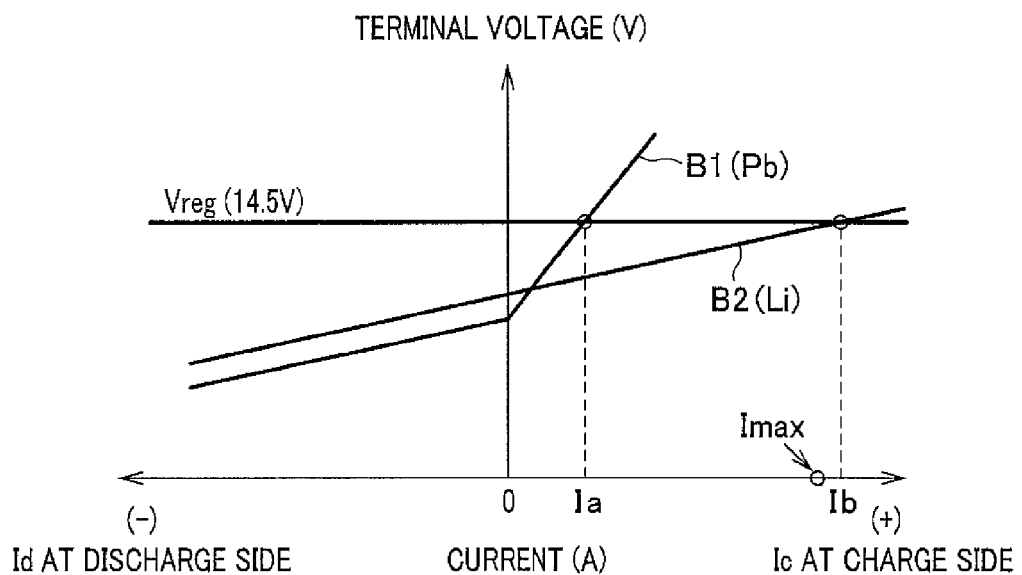
FIG. 3 is a view showing a difference in I-V characteristics between the lead-acid battery and the lithium battery in the power source apparatus according to the first embodiment of the present invention.

FIG. 3 is a view showing a difference in I-V characteristics between the lead-acid battery 20 and the lithium battery 30 in the power source apparatus according to the first embodiment. In FIG. 3, the solid line B1 indicates the I-V characteristic of the lead-acid battery 20, the solid line B2 designates the I-V characteristic of the lithium battery 30, the solid line B3 denotes the constant voltage Vreg, the horizontal line indicates the current value Ic and the current value Id, the vertical line indicates the terminal voltage Vc and the terminal voltage Vd. In FIG. 3, the current Ic during charging is expressed by a positive value, and the current Id during discharging is expressed by a negative value.

In the I-V characteristic B1 and the I-V characteristic B2, the more the charging current Ic increase, the more the terminal voltage Vc increases (Ic×R is increased). The more the charging current Ic decreases, the more the terminal voltage Vc decreases (Ic×R is decreased). That is, the change of the charging current Ic is in proportion to the change of the charging current Ic. The slope of each of the I-V characteristic B1 and the I-V characteristic B2 indicates the internal resistance R. In particular, the lithium battery 30 has the same internal resistance value R (Pb) during both charging and discharging. On the other hand, an internal resistance value R (Pb) in charging of the lead-acid battery 20 is larger than that in discharging of the lead-acid battery 20.

In the first embodiment, it is set to satisfy the relationship of R (Li)<R (Pb) in charging, and to satisfy the relationship of R (Li)≤R (Pb) in discharging. It is also set to satisfy the relationship of Vd (Li)>Vd (Pb) in discharging, to satisfy the relationship of Vc (Li)≥Vc (Pb) in a range close to Ic=zero, and to satisfy the relationship of Vc (Li)<Vc (Pb) in other part. The above setting control can be achieved by the condition where the internal resistance value R (Li) of the lithium battery 30 is smaller than the internal resistance value R (Pb) of the lead-acid battery 20 in charging.

The power source apparatus having the above structure according to the first embodiment of the present invention has the following features (A1) to (A6).

(A1) Making the voltage characteristic A2 to satisfy the condition (a) (the equal voltage point Vds is present in the range between the inflection points P1 and P2) generates the state without any large voltage difference between the lithium battery 30 and the lead-acid battery 20 because the terminal voltage Vd (Li) in the use range of SOC of the lithium battery 30 is approximately equal to the terminal voltage Vd (Pb) in the use range W1 of SOC of the lead-acid battery 20 during discharge, as shown in FIG. 2A.

Therefore even if does not use any DC/DC converter (which is used in the conventional power source apparatus), it is possible to prevent a current which flows from the lithium battery 30 to the lead-acid battery 20, in other words, it is possible to flow a current of an extremely small quantity from the lithium battery 30 to the lead-acid battery 20. The structure of the power source apparatus according to the first embodiment can thereby suppress the lead-acid battery 20 from being in overcharge state without any DC/DC converter. This makes it possible to adequately reduce the manufacturing cost of the power source apparatus because of not using any DC/DC converter.

(A2) Making the voltage characteristic A2 to satisfy the condition (b) (the relationship of Vd (Li)>Vd (Pb) at the upper limit side observed from the equal voltage point Vds) to the voltage characteristic A1 allows the lithium battery 30 to discharge a current, for example, to the electric load 43 which requires a constant voltage, because the open circuit voltage of the lithium battery 30 is higher than that of the lead-acid battery 20, in the state where the lithium battery 30 is higher charged than the equal voltage point Vds in the use range W2 (Li) of SOC of the lithium battery 30.

Because this condition increases the frequency of discharging a current from the lithium battery 30 when compared with from the lead-acid battery 20 and decreases the frequency of discharging a current from the lead-acid battery 20 with a low durability to frequent discharging, this makes it possible to suppress the deterioration of the lead-acid battery 20.

(A3) Making the voltage characteristic A2 to satisfy the condition (c) (Vc (Li)<Vreg when the maximum charging current flows) to the voltage characteristic A1 can increase the frequency of charging the lithium battery 30 rather than the lead-acid battery 20 by the following reasons.

In the case of charging the lead-acid battery 20 with the regenerative energy without using the lithium battery 30, because the internal resistance 22 of the lead-acid battery 20 is larger than that of the lithium battery 30, as shown in FIG. 3, the terminal voltage Vc (Pb) of the lead-acid battery 20 reaches the constant voltage Vreg at the point when the charging current reaches the current value Ia. On the other hand, the structure of the power source apparatus equipped with the lithium battery 30 satisfies the relationship of Vc (Li)<Vreg even when the charging current has the maximum value, it is possible to further charge the lithium battery 30.

In the example shown in FIG. 3, the terminal voltage Vc (Li) of the lithium battery 30 reaches the constant voltage Vreg when the charging current reaches the current value Ib which is larger than the maximum charging current Imax.

Figure 4A:
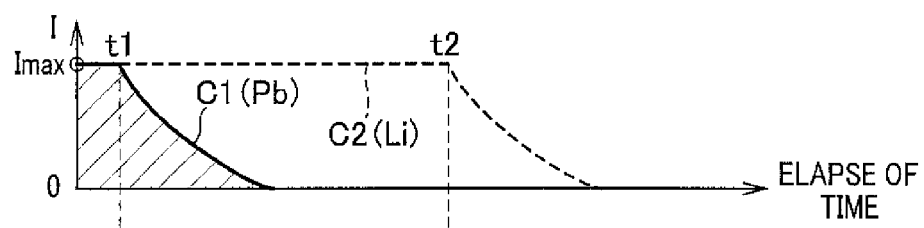
FIG. 4A shows a current change of the lead-acid battery and the lithium battery in the elapse of time.
Figure 4B:
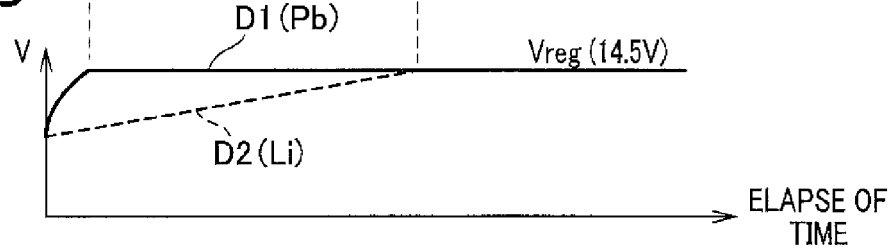
FIG. 4B shows a terminal voltage change of the lead-acid battery and the lithium battery in the elapse of time.

This will be explained in detail with reference to FIG. 4A and FIG. 4B. FIG. 4A shows a current change of the lead-acid battery 20 and the lithium battery 30 in the elapse of time. FIG. 4B shows a terminal voltage change of the lead-acid battery 20 and the lithium battery 30 in the elapse of time. In FIG. 4A and FIG. 4B, the solid lines C1 and D1 indicate the change of the charging current and the terminal voltage Vc (Pb) when the lead-acid battery 20 is charged with the regenerative electric power at the maximum charging current Imax without using the lithium battery 30. The solid lines C2 and D2 in FIG. 4A and FIG. 4B show the change of the charging current and the change of the terminal voltage Vc (Li), respectively, when the lithium battery 30 is charged with the regenerative electric power at the maximum charging current Imax in the power source apparatus according to the first embodiment.

As previously explained with reference to FIG. 3, because the relationship of Imax>Ia is satisfied when the lead-acid battery 20 is charged with the regenerative electric power, the charging current rapidly drops at the timing t1 and converges toward zero, as shown in FIG. 4A. This state would be difficult to charge the lead-acid battery 20. In this case, the area designated by slanting lines in FIG. 4A corresponds to the charged capacity of the lead-acid battery 20.

On the other hand, because the relationship of Imax≤Ib is satisfied when the lithium battery 30 is charged with the regenerative electric power, the charging current maintains the value Imax until the timing t2 where the SOC of the lithium battery 30 reaches the upper limit value (90%). This allows the lithium battery 30 to be usually charged and to increase its changeable capacity.

As described above, according to the first embodiment of the present invention, it is possible to increase the frequency to charge the lithium battery 30 rather than the frequency to charge the lead-acid battery 20. This can decrease the accumulated charged capacity of the lead-acid battery 20 which has a low durability, and suppress the deterioration of the lead-acid battery 20.

(A4) Making the voltage characteristic A2 to satisfy the condition (d) (Vd (Li)<Vd (Pb) at the lower limit side observed from the equal voltage point Vds) to the voltage characteristic A1 allows the lead-acid battery 20, instead of the lithium battery 30, to discharge the electric power to the electrical loads 40 when the lithium battery 30 preferentially discharge the electric power to the electric load 40 and the SOC of the lithium battery 30 is lower than the equal voltage point Vds.

Further, the current flows from the lead-acid battery 20 to the lithium battery 30, this increases the SOC of the lithium battery 30 toward the equal voltage point Vds. As a result, it is possible to suppress the lithium battery 30 from over discharge.

(A5) Making the voltage characteristic A2 to satisfy the condition (e) to the voltage characteristic A1 allows the range to satisfy the relationship of Vd (Li)>Vd (Pb) based on the condition (b), where the condition (e) satisfies that the range in the upper limit side observed from the equal voltage point Vds is wider in area than the range in the lower limit side observed from the equal voltage point Vds. This makes it possible to increase the frequency of preferentially discharging from the lithium battery 30 rather than from the lead-acid battery 20. This makes it possible to increase the deterioration resistance of the lead-acid battery 20.

(A6) Adding the lithium battery 30 which satisfies the conditions (a) to (e) into a power source apparatus which is comprised of the alternator 10, the regulator 11, and the lead-acid battery 20 makes it possible to obtain the features of the present invention, previously described without using any DC/DC converter. It is possible to realize the power source apparatus according to the first embodiment of the present invention in a conventional power source apparatus with a less change in hardware design.

Second Embodiment

Figure 5:
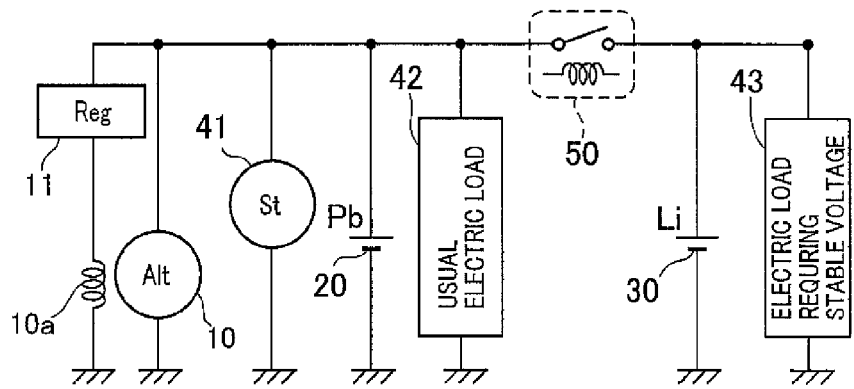
FIG. 5 is a block diagram showing a schematic electric circuit of a power source apparatus for vehicle according to a second embodiment of the present invention.

A description will be given of the power source apparatus according to the second embodiment of the present invention with reference to FIG. 5. FIG. 5 is a block diagram showing a schematic electric circuit of the power source apparatus according to the second embodiment.

In the structure of the power source apparatus according to the second embodiment shown in FIG. 5, the lithium battery 30 supplies the electric power to electrical loads 43 which require an approximate constant voltage or a voltage which is changed within at least a predetermined voltage range. For example, there are a navigation system and an audio system as the electrical loads 43 mounted to vehicles. When the power source apparatus supplies electric power, a voltage of which is fluctuated, not constant, or changed out from a predetermined allowable range, and when the voltage of the electric power temporarily drops below a minimum operation voltage, the navigation system and/or audio system as the electric load 43 are reset in operation. This would cause various problems. In order to avoid this, it is necessary for the power source apparatus to supply the voltage of the electric power which is an approximate constant voltage which is larger than the minimum operation voltage.

On the other hand, the lead-acid battery 20 supplies the electric power to the starter motor 41 and usual electrical loads 42 such as a defroster heater for a rear window, and a ventilation fan for an air conditioner system. The starter motor 41 requires a large electric power when compared with the electrical loads 42 and 43. When the lead-acid battery 20 supplies such a large electric power to the starter motor 41, the terminal voltage Vd (Pb) of the lead-acid battery 20 rapidly drops.

However, the structure of the power source apparatus according to the second embodiment has the electromagnetic relay 50 to open and close the electric connection between the lithium battery 30 and the starter motor 41 in order to avoid the rapid drop of the terminal voltage Vd (Li) of the lithium battery 30. Specifically, while the lead-acid battery 20 supplies the electric power to the starter motor 41, the electromagnetic relay 50 is opened in order to avoid the voltage drop of the lithium battery 30. This makes it possible for the lithium battery 30 to supply a stable electric power, a voltage of which is slightly changed within a predetermined voltage range, to the electrical loads 43.

When the lead-acid battery 20 does not store an adequate capacity to start the starter motor 41, it is possible to turn on the electromagnetic relay 50 to supply the electric power to the starter motor 41. That is, when the lead-acid battery 20 has a low SOC, it is controlled so that the lithium battery 30 rather than the lead-acid battery 20 preferentially supplies the electric power to the starter motor 41.

As described above, the power source apparatus according to the second embodiment of the present invention has the following effect (7) in addition to the effects (1) to (6), previously described in the first embodiment.

(7) The lithium battery 30 supplies the electric power to the electrical loads 43 which require an approximate constant voltage or a stable voltage which is changed within the predetermined voltage range, and the lead-acid battery 20 supplies the electric power to the starter motor 41. While the lead-acid battery 20 supplied the electric power to the starter motor 41, the electromagnetic relay 50 operates to open. This makes it possible to supply to the electrical loads 43 the electric power whose voltage has a small fluctuation in voltage.

Third Embodiment

Figure 6:
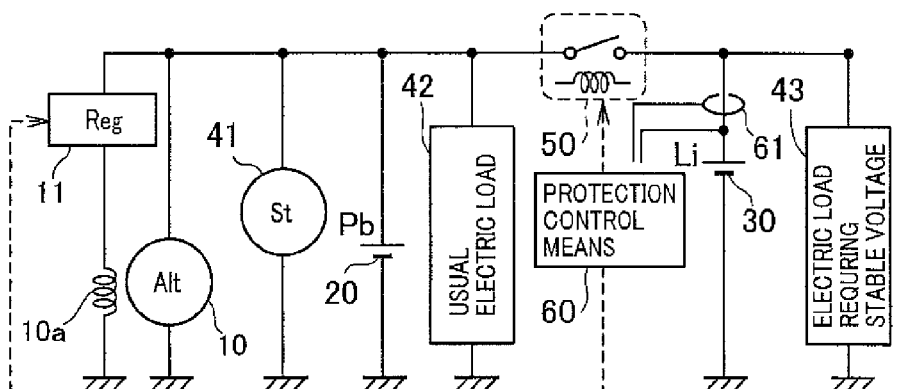
FIG. 6 is a block diagram showing a schematic electric circuit of a power source apparatus for vehicle according to a third embodiment of the present invention.

A description will be given of the power source apparatus according to the third embodiment of the present invention with reference to FIG. 6. FIG. 6 is a block diagram showing a schematic electric circuit of the power source apparatus according to the third embodiment of the present invention.

The power source apparatus according to the third embodiment has a protection control means 60 which controls the charging capacity to and discharging capacity from the lithium battery 30 in order to avoid the overcharging to the lithium battery 30 and the over discharging from the lithium battery 30.

The protection control means 60 always receives detection signals regarding the terminal voltages Vc and Vd or the open circuit voltage V0 (Li) of the lithium battery 30, and a detection signal transferred from a current detection means 61 which detects a current flowing in the lithium battery 30.

The protection control means 60 instructs the electromagnetic relay 50 to open (voltage drop suppression operation) when the terminal voltage Vd of the lithium battery 30 during discharging becomes below the lower limit voltage. This control protects the lithium battery 30 from over discharge. It is possible to set the lower limit voltage based on a voltage which corresponds to the lower limit SOC value (10%) shown in FIG. 2B.

When the terminal voltage Vc of the lithium battery 30 during charge exceeds the upper limit voltage, the protection control means 60 instructs the electromagnetic relay 50 to open (voltage rise suppression operation). This control protects the lithium battery 30 from over charging. It is possible to set the upper limit voltage based on a voltage which corresponds to the upper limit SOC value (90%) shown in FIG. 2B.

The protection control means 60 further outputs an instruction signal to the regulator 11 to change the constant voltage Vreg of the regulator 11 according to the voltage of the lithium battery 30. This makes it possible to prevent or protect the lithium battery 30 from overcharge and over discharge.

That is, the protection control means 60 instructs the regulator 11 to increase the constant voltage Vreg when the voltage of the lithium battery 30 becomes lower than the lower limit value. This increases the charging capacity to the lithium battery 30 and protects the lithium battery 30 from over discharge.

On the other hand, the protection control means 60 instructs the regulator 11 to decrease the constant voltage Vreg when the voltage of the lithium battery 30 exceeds the upper limit value. This suppresses the charging capacity to the lithium battery 30, and protects the lithium battery 30 from overcharge.

As describe above, the power source apparatus according to the third embodiment of the present invention reliably avoids the lithium battery 30 from over discharge because the protection control means 60 instructs the electromagnetic relay 50 to open when the terminal voltage of the lithium battery 30 becomes lower than the use range W2 (Li) of the lithium battery 30 in addition during the supply of the electric power to the starter motor 41.

Further, the power source apparatus according to the third embodiment of the present invention can reliably avoid the lithium battery 30 from overcharge because the protection control means 60 instructs the electromagnetic relay 50 to open.

Because the power source apparatus according to the third embodiment of the present invention performs the over discharge and overcharge protection operation by changing the constant voltage Vreg by the protection control means 60. This can precisely control the voltage of the lithium battery 30, and this makes thereby it possible to perform the over discharge protection and the overcharge protection for the lithium battery 30 with high accuracy.

Fourth Embodiment

Figure 7:
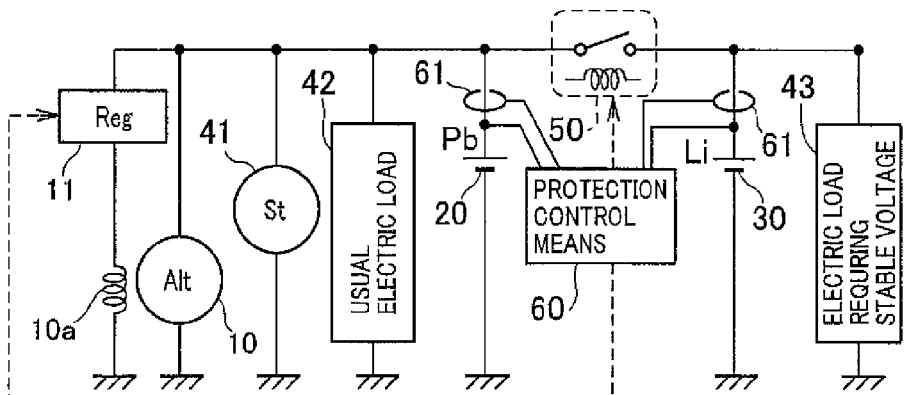
FIG. 7 is a block diagram showing a schematic electric circuit of a power source apparatus for vehicles according to a fourth embodiment of the present invention.

A description will be given of the power source apparatus according to the fourth embodiment of the present invention with reference to FIG. 7. FIG. 7 is a block diagram showing a schematic electric circuit of a power source apparatus according to the fourth embodiment.

In the third embodiment previously described, the power source apparatus has the protection control means 60 to protect the lithium battery 30 from overcharge and over discharge.

On the other hand, the protection control means 60 in the power source apparatus of the fourth embodiment further performs the overcharge operation and the over discharge operation for the lead-acid battery 20 in addition to the function of the third embodiment.

That is, the protection control means 60 instructs the regulator 11 to increase the constant voltage Vreg when the voltage of the lead-acid battery 20 becomes under the lower limit voltage. This performs the over discharge operation of the lead-acid battery 20. On the other hand, the protection control means 60 instructs the regulator 11 to decrease the constant voltage Vreg when the voltage of the lead-acid battery 20 exceeds the upper limit voltage. This performs the overcharge operation of the lead-acid battery 20.

As describe above, the power source apparatus according to the fourth embodiment of the present invention correctly changes the constant Vreg according to the voltage of the lead-acid battery 20, in addition to changing the constant voltage Vreg according to the voltage of the lithium battery 30. This can precisely control the voltage of the lead-acid battery 20 in addition to the voltage of the lithium battery 30, and makes thereby it possible to perform the over discharge protection and the overcharge protection for the lead-acid battery 20 as well as the lithium battery 30 with high accuracy.

Fifth Embodiment

Figure 8:
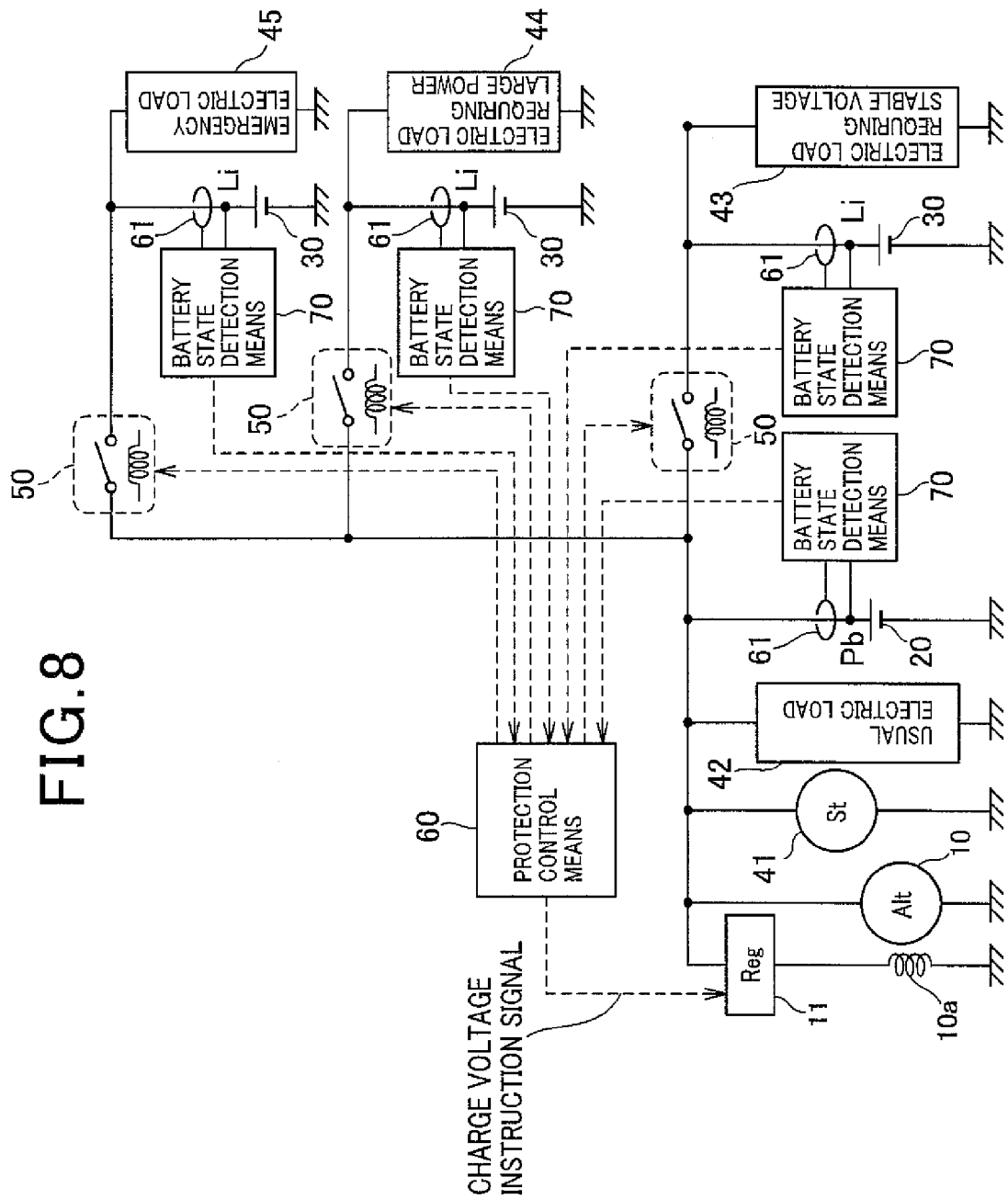
FIG. 8 is a block diagram showing a schematic electric circuit of a power source apparatus for vehicle according to a fifth embodiment of the present invention.

A description will be given of the power source apparatus according to the fifth embodiment of the present invention with reference to FIG. 8. FIG. 8 is a block diagram showing a schematic electric circuit of the power source apparatus according to the fifth embodiment.

The power source apparatus according to the fifth embodiment has a plurality of the lithium batteries 30. In the structure of the power source apparatus according to the fifth embodiment, the electric power is supplied from the different lithium batteries 30 to various types of the electric loads 43, 44, and 45, where the electrical loads 43 requires an approximate constant voltage or a stable voltage which is changed within the predetermined voltage range, the electric loads 44 requires a large electric power, and the electric load 45 requires a voltage in order to reliably operate when an emergency occurs.

Specifically, there is an electric motor mounted to a power steering apparatus as one example of the electric load 44 which requires a large electric power. The electric load 44 can operate by some fluctuating voltage, which is different from the electrical loads 43 which require an approximate constant voltage, previously described.

There is a communication apparatus as one example of the electric load 45 which requires a certain operation when an emergency occurs. This communication apparatus transmits abnormality information to a repair operator in a car dealership to diagnose and repair the vehicle, for example, when the internal combustion engine mounted to the vehicle has a failure and does not start. Therefore it is not necessary for such a type of the electric load 44 to use a large electric power and a constant voltage.

The power source apparatus according to the fifth embodiment shown in FIG. 8 has a plurality of the electromagnetic relays 50, battery state detection means 70, and the current detection means 61, like the power source apparatus shown in FIG. 6. That is, the electromagnetic relay 50, the battery state detection means 70, and the current detection means 61 are placed every lithium battery 30.

The battery state detection means 70 always detects the terminal voltages Vc, Vd or the open circuit voltage V0 (Li) of the lithium battery 30, and a current flowing through the lithium battery 30. The battery state detection means 70 then transfers the detection signals to the protection control means 60. The protection control means 60 receives the detection signals transferred from the battery state detection means 70, and performs the overcharge control and the over discharge control by using the electromagnetic relay 50, and also performs the overcharge and over discharge protection control by adjusting the constant voltage Vreg, like the protection control means 60 shown in FIG. 6.

As describe above, the power source apparatus according to the fifth embodiment of the present invention has a plurality of the lithium batteries 30. The lithium batteries 30 correspond to the electrical loads, respectively.

This structure makes it possible to suppress the deterioration of each of the lithium batteries 30. In particular, because the electric load 45 for emergency has the dedicated lithium battery 30, it is possible to suppress the deterioration of the lithium battery 30 and to avoid the risk of not supplying the electric power to the electric load 45.

Sixth Embodiment

Figure 9:
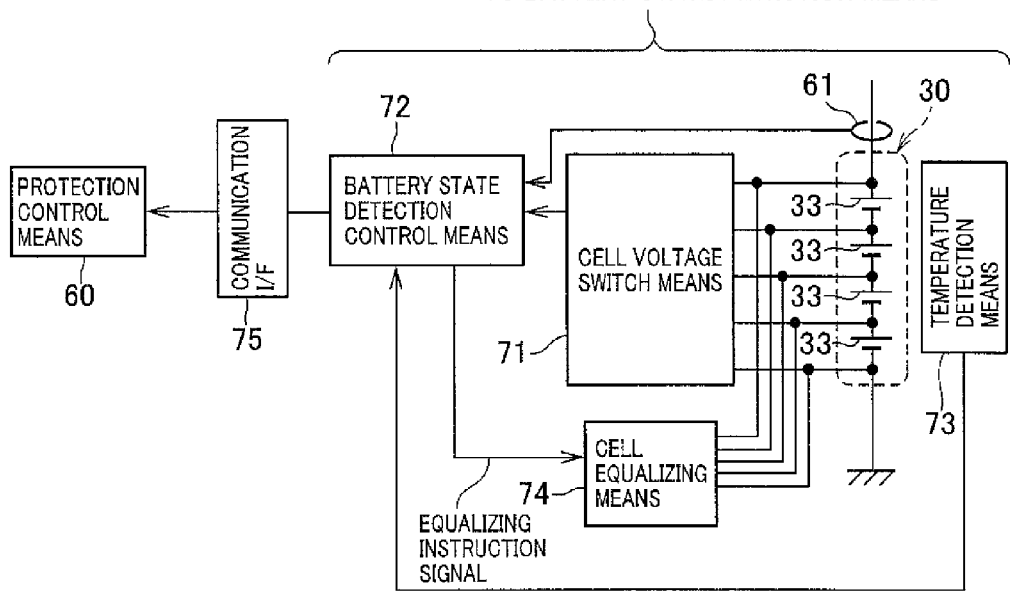
FIG. 9 is a block diagram mainly showing a detailed structure of the battery state detection means in the power source apparatus according to a sixth embodiment of the present invention.

A description will be given of the power source apparatus according to the sixth embodiment of the present invention with reference to FIG. 9. FIG. 9 is a block diagram mainly showing a detailed structure of the battery state detection means 70 in the power source apparatus shown in FIG. 8.

The battery state detection means 70 is comprised of a cell voltage switch means 71, a battery state detection control means 72, a temperature detection means 73, and a cell equalizing means 74. The cell voltage switch means 71, the battery state detection control means 72, the temperature detection means 73, and the cell equalizing means 74 serve as equalizing means.

The cell voltage switch means 71 detects the voltage of each of a plurality of the battery cells 33 which form the lithium battery 30. The cell voltage switch means 71 has a function to select one of the battery cells 33 in order to detect its voltage. The cell voltage switch means 71 detects the voltage of the selected battery cell and then transfers the detected voltage value to the battery state detection control means 72. The battery state detection control means 72 also receives a detected current value of the current which flows in the lithium battery 30. The battery state detection control means 72 further receives a temperature value of the lithium battery 30 detected by the temperature detection means 73.

The battery state detection control means 72 calculates the terminal voltages Vc, Vd or the open circuit voltage V0 (Li) of the lithium battery 30 based on the voltage of each of the battery cells 33. The battery state detection control means 72 transfers the calculated voltage, the current value of the lithium battery 30, and the temperature value of the lithium battery 30 to the protection control means 60 through the communication interface 75. The protection control means 60 receives the information such as the above voltage value, the current value, and the temperature value transferred from the battery state detection control means 72, and performs the protection control based on the received information.

The battery state detection control means 72 calculates a discharge capacity from the battery cell 33 having a high SOC, and a charge capacity to the battery cell 33 having a low SOC based on the received voltage value of the battery cell 33. The battery state detection control means 72 outputs an equalizing instruction signal corresponding to the calculation result to the cell equalizing means 74. When receiving the equalizing instruction signal, the cell equalizing means 74 instructs each of the battery cells 33 to discharge or charge based on the received equalizing instruction signal in order to equalize the SOC (state of charge as a residual capacity) in each of the battery cells 33.

As describe above, the power source apparatus according to the sixth embodiment of the present invention can equalize the SOC in each of the battery cells 33. This makes it possible to avoid the presence of the overcharged battery cells 33 and the battery cells having an adequate SOC during charging. Like this, it is also possible to avoid the presence of the over discharged battery cells 33 and the battery cells having an adequate SOC during discharging. The power source apparatus according to the sixth embodiment can suppress the advance of deterioration of the lithium battery 30.

Seventh Embodiment

A description will be given of the power source apparatus according to the seventh embodiment of the present invention with reference to FIG. 10.

In the power source apparatus according to the sixth embodiment previously described shown in FIG. 9, the cell voltage switch means 71 and the battery state detection control means 72 are formed with different circuit parts. The power source apparatus according to the seventh embodiment has a single IC 710 (integrated circuit as cell equalizing abnormal detection means) which is composed of the cell voltage switch means 71 and the cell equalizing means 74.

Figure 10:
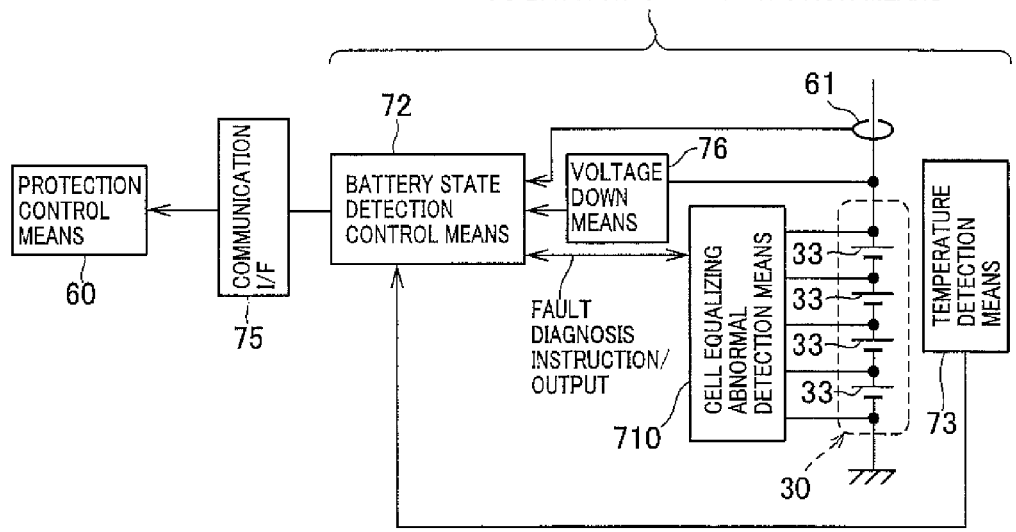
FIG. 10 is a block diagram mainly showing a detailed structure of the battery state detection means in the power source apparatus according to a seventh embodiment of the present invention.

FIG. 10 is a block diagram mainly showing a detailed structure of the battery state detection means 70 comprised of the single IC chip 710 in the power source apparatus according to the seventh embodiment.

The cell equalizing abnormal detection means 710 detects the voltage of each of the battery cells 33, and calculates the charging capacity to or discharging capacity from each of the battery cells 33 based on the detected voltage. The cell equalizing abnormal detection means 710 equalizes the residual capacity of each of the battery cells 33 by charging and discharging each of the battery cells 33 based on the calculation result.

The cell equalizing abnormal detection means 710 further detects whether or not the detected voltage of each of the battery cells 33 is within a predetermined normal range in order to detect the abnormality of each of the cell batteries 33. When receiving an abnormal diagnosis instruction signal transferred from the battery state detection control means 72, the cell equalizing abnormal detection means 710 starts to perform the abnormal detection operation previously described, and transfers the detection result to the battery state detection control means 72.

A voltage down means 76 decreases the voltage of the lithium battery 30 to a voltage of not more than 5 V, with which a microcomputer can operate. Such a voltage signal decreased by the voltage down means 76 is transferred to the battery state detection control means 72, and then further transferred to the protection control means 60 through the communication interface 75.

As described above, the power source apparatus according to the seventh embodiment of the present invention has the effect to perform the abnormal detection operation for each of the battery cells 33 in addition to have the same effects of the power source apparatus according to the sixth embodiment.

(Other Modifications)

The present invention is not limited by the first to seventh embodiments previously described. It is possible to have the following structures or to selectively combine the structures of the first to seventh embodiments.

For example, it is possible to use a semiconductor switch such as MOSFET and IGBT or a manual switch instead of the electromagnetic relay 50. Such a semiconductor switch has a superior response function and superior durability when compared with the electromagnetic relay 50, but is generally a high price.

It is also possible to use a combination of a diode and a resistance instead of using the electromagnetic relay 50 which has a switching mechanism to connect the lithium battery 30 with the starter motor 41, and to disconnect the electrical connection between the lithium battery 30 and the starter motor 41. The combination of the diode and the resistance can suppress the current which flows to the starter motor 41 from the lithium battery 30 in order to suppress the voltage drop of the lithium battery 30.

Although each of the first to seventh embodiments uses the lithium battery 30 having the voltage characteristic A2 composed of non-aqueous electrolyte, it is possible to use a nickel battery composed of nickel compound, instead of using the lithium battery 30, unless it satisfies at least the conditions (a) to (c), previously described.

In each of the first to seventh embodiments, the equal voltage point Vds is present at the upper limit side observed from the lower limit value (10%) in the use range W2 (Li) of SOC of the lithium battery 30. However, the concept of the present invention is not limited by this. For example, it is possible to set the equal voltage point Vds to the lower limit value.

In each of the first to seventh embodiments, the vehicles with the power source apparatus have the regenerative function. However, the concept of the present invention is not limited by this. For example, it is possible to apply the power source apparatus to vehicles without the regenerative function. By the way, because the vehicle having the regenerative function has a high frequency to charge the regenerative energy to the battery, it is possible to show the feature of the present invention to suppress the deterioration of the lead-acid battery 20 by reducing the accumulated charged capacity in the lead-acid battery 20 with a low durability.

Eighth Embodiment

A description will now be given of the power source apparatus according to the eighth embodiment of the present invention with reference to FIG. 11A, FIG. 11B, FIG. 11C, FIG. 12A, FIG. 12B, FIG. 13, and FIG. 14A, and FIG. 14B.

The power source apparatus according to the eighth embodiment can be applied to various types of vehicles with an internal combustion engine. For example, the power source apparatus according to the eighth embodiment can be applied to a vehicle equipped with an idle reduction apparatus. The idle reduction apparatus automatically stops the operation of the internal combustion engine when a predetermined engine stop condition is satisfied, and also automatically restarts the internal combustion engine when a predetermined engine restart condition is satisfied, as previously described. The idling reduction apparatus will be referred to as the "idle stop apparatus or idle stop function" through the following explanation.

In the eighth embodiment, the vehicle equipped with the power source apparatus has a starter motor to rotate a crank shaft of the internal combustion engine when the internal combustion engine starts to operate. However, the vehicle does not mount any driving motor capable of assisting the vehicle to drive.

Figure 11A:
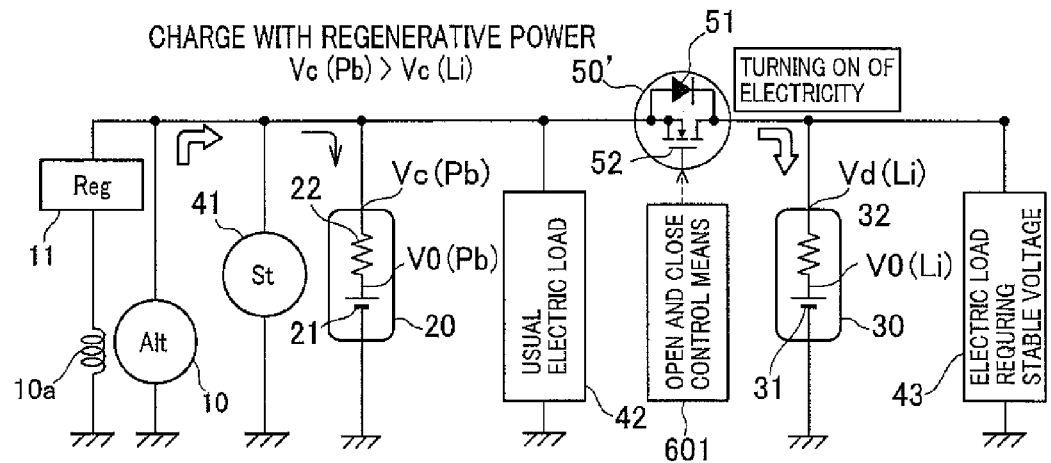
FIG. 11A, FIG. 11B, and FIG. 11C are block diagrams showing a schematic electric circuit of a power source apparatus for vehicles according to an eighth embodiment of the present invention.
Figure 11B:
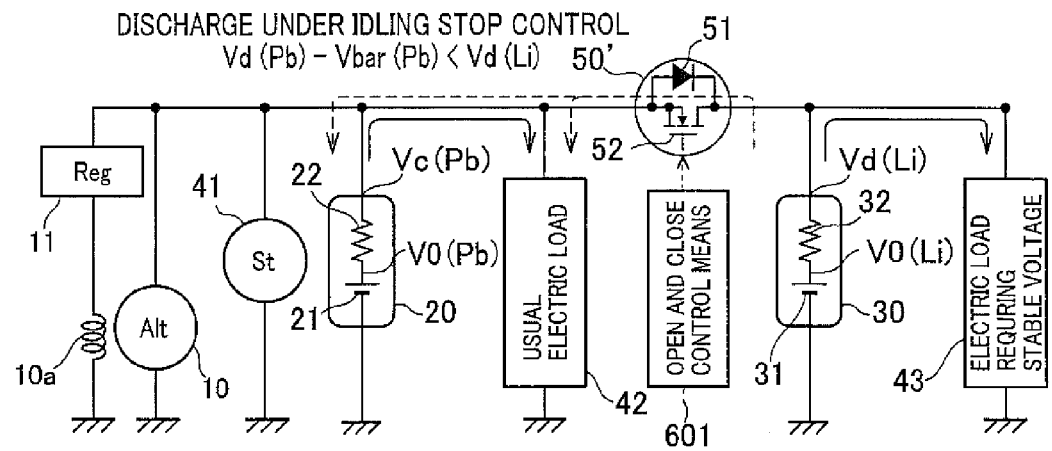
Figure 11C:
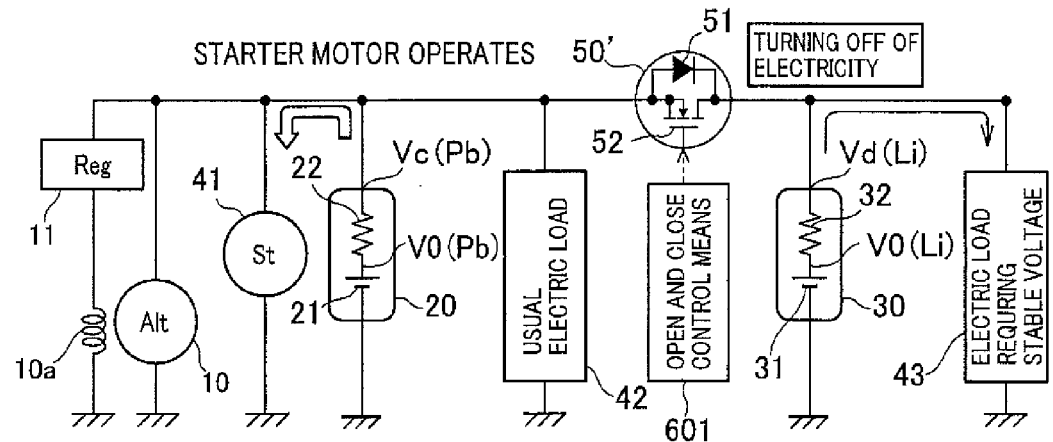

FIG. 11A, FIG. 11B, and FIG. 1C are block diagrams showing a schematic electric circuit of the power source apparatus for vehicle according to the eighth embodiment. As shown in FIG. 11A, FIG. 11B, and FIG. 11C, the alternator 10 (electric generator), the regulator 11 (constant voltage control means), the lead-acid battery 20, the lithium battery 30 (secondary battery), and various types of electrical loads 41, 42, and 43, and a MOS FET 50' (open and close means, rectifying means). The lead-acid battery 20, the lithium battery 30, and the electrical loads 41, 42, and 43 are electrically connected in parallel to the alternator 10.

The MOS FET 50' is placed between the lithium battery 30 and a connection node which connects the alternator 10 with the lead-acid battery 20. The MOS FET 50' serves as the open and close means to close (ON) and open (OFF) the electric connection between the lithium battery 30 and the connection node which connects the alternator 10 with the lead-acid battery 20.

The MOS FET 50' also serves as the rectifier means in views of its structure. That is, the internal circuit of the MOS FET 50' is equivalent to a circuit in which a semiconductor switch part 52 (open and close control means) and a parasitic diode 51 connected in parallel. The open and close control means 601 generates and transfers an control signal to the gate of the semiconductor switch part 52. That is, the open and close control means 601 controls to switch ON operation (close) and OFF operation (open) of the MOS FET 50'.

The electric load 43 in the electric loads 41 to 43 requires a constant voltage or a stable voltage which is changed within a predetermined voltage range. The electric load 43 is connected to the lithium battery 30 side observed from the MOS FET 50'. This structure allows the lithium battery 30 to supply electric power to the electric load 43 (see the solid arrow mark at right side in FIG. 11B and FIG. 11C).

For example, there are a navigation system and an audio system as the electrical load 43, for example, mounted to vehicles. When the power source apparatus supplies electric power, a voltage of which is fluctuated, not constant, or changed out from a predetermined voltage range, and when the voltage of the electric power temporarily drops below a minimum operation voltage, the navigation system and/or audio system as the electric load 43 are reset in operation. This would cause various problems. In order to avoid these problems, it is necessary for the power source apparatus to supply the electric power, a voltage of which must be an approximate constant voltage which is larger than the minimum operation voltage.

On the other hand, the electric load 41 is a starter motor to start the operation of the internal combustion engine. The electric load 42 is a usual electrical load such as a defroster heater for a rear window and a ventilation fan for an air conditioner system. The starter motor 41 and the electric load 42 are connected to the lead-acid battery 20 side observed from the MOS FET 50'. That is, the lead-acid battery 20 supplies electric power to the starter motor 41 and the usual electric load 42 (see the solid arrow line at left side in FIG. 11B and the outline arrow mark at left side in FIG. 11C).

The starter motor 41 requires a large electric power when compared with other electrical loads 42 and 43. When the lead-acid battery 20 supplies such a large electric power to the starter motor 41, the terminal voltage Vd (Pb) of the lead-acid battery 20 rapidly drops.

However, the structure of the power source apparatus according to the eighth embodiment has the MOS FET 50' to open and close the electric connection between the lithium battery 30 and the starter motor 41 in order to avoid the rapid drop of the terminal voltage Vd (Li) of the lithium battery 30. Specifically, while the lead-acid battery 20 supplies the electric power to the starter motor 41, the MOS FET 50' is switched in order to prevent the voltage drop of the lithium battery 30. This makes it possible for the lithium battery 30 to supply electric power, a voltage of which is slightly changed within a predetermined voltage range, to the electrical loads 43.

When the lead-acid battery 20 does not store an adequate capacity to start the starter motor 41, it is possible to turn on the MOS FET 50' to supply the electric power to the starter motor 41. That is, when the lead-acid battery 20 has a low SOC, it is controlled so that the lithium battery 30 rather than the lead-acid battery 20 preferentially supplies the electric power to the starter motor 41. In the example shown in FIG. 11A, FIG. 11B, and FIG. 11C, the usual electric load 42 is electrically connected to the lead-acid battery 20 side observed in position from the MOS FET 50'. However, it is also possible to electrically connect the usual electric load 42 with the lithium battery 30 in order for the lithium battery 30 to supply a part of the electric power which is required by the electric load 42.

The open and close control means 601 instructs the MOS FET 50' to open (to be turned off) during the ordinary mode, but, instructs it to close (to be turned on) in order to charge the lithium battery 30 with a large current, and to discharge the electric capacity of the lithium battery 30 to the lead-acid battery 20 (see FIG. 11A). For example, the open and close control means 601 instructs the MOS FET 50' to be turned on in order to efficiently charge the lithium battery 30 with a large current of regenerative electric power generated when the vehicle speed is decreased, or in order to charge the lead-acid battery 20 from the lithium battery 30 when the lead-acid battery 20 is in the overcharged state based on information such as the SOC of the lead-acid battery 20 and the vehicle speed.

During the turned-off state of the MOS FET 50', the parasitic diode 51 rectifies the charging current which flows to the lithium battery 30 or discharging current which flows from the lithium battery 30. That is, during the off state of the MOS FET 50', the current can flow from the alternator 10 or the lead-acid battery 20 to the lithium battery 30, but cannot flow from the lithium battery 30 to the alternator 10 or the lead-acid battery 20 (see FIG. 11C).

Because the parasitic diode 51 has a barrier voltage Vbar (which is a voltage required to cause an electric conduction at a connection part between two different materials such as p-n junction), a voltage drop is generated in the electric power flowing through the parasitic diode 51 by the barrier voltage Vbar. Therefore, a current flows to the lithium battery 30 through the parasitic diode 51. The lithium battery 30 is thereby charged when the terminal voltage Vd (Li) when the lithium battery 30 is not more than a difference voltage obtained by subtracting the barrier voltage Vbar from the voltage of the electric power generated by the alternator 10 or the terminal voltage Vd (Pb) of the lead-acid battery 20 when the MOS FET 50' is turned off.

Under the turned off state of the MOS FET 50' when the lithium battery 30 is charged with the regenerative electric power which is regenerated by the alternator during the deceleration of the vehicle, a large current flows to the lithium battery 30 (secondary battery) through the parasitic diode 51. This causes a large energy loss when the generated current flows through the parasitic diode 51.

In order to avoid such the large energy loss in the parasitic diode 51, the power source apparatus according to the eighth embodiment instructs the MOS FET 50' to be turned on when the lithium battery 30 is charged with the regenerative energy generated by the alternator when the vehicle speed is decreased (see FIG. 11C). This control operation of the power source apparatus allows the current of the regenerative electric power to flow into the lithium battery 30 by bypassing it through the parasitic diode 51. This eliminates the energy loss generated in the parasitic diode 51. That is, it is possible to avoid the energy loss generated by the alternator 10.

The power source apparatus according to the eighth embodiment instructs the MOS FET 50' to be turned on in order to charge the lead-acid battery 20 with the electric power (electric capacity) from the lithium battery 30, for example, when the lead-acid battery 20 has not an adequate capacity to supply the electric power to the usual electric load 42 and the starter motor 41 (see dotted arrow lines shown in FIG. 111B).

The control to turn on the MOS FET 50' when the terminal voltage Vd (Pb) of the lead-acid battery 20 is lower than the terminal voltage Vd (Li) of the lithium battery 30 makes it possible to supply the electric power from the lithium battery 30 to the lead-acid battery 20, and to the usual electric load 42 and the starter motor 41.

The alternator 10 generates electric power when receiving a rotary energy transmitted through the crank shaft of the internal combustion engine. Specifically, the rotor of the alternator 10 engages with the crank shaft. Rotation of the rotor of the alternator 10 when receiving the rotary energy of the crank shaft generates an exciting current in a rotor coil 10a of the alternator 10. The exciting current then flows in the rotor coil 10a. An alternating current is thereby induced in a stator coil of the alternator 10 according to the magnitude of the exciting current. A rectifier (not shown) rectifies the induced alternating current to a direct current. The regulator 11 adjusts the magnitude of the rectified current which is flowing through the rotor coil 10a so as to control a voltage of the alternator 10 generated by the induced current to be constant (a constant voltage Vreg). This makes it possible to suppress fluctuation of the output voltage of the alternator 10. In the eighth embodiment, the constant voltage Vreg is 14.5 V.

The electric power generated in the alternator 10 is supplied to the electrical loads 41, 42, and 43, and also supplied to the lead-acid battery 20 and the lithium battery 30. During the operation not to generate any electric power in the alternator 10 when the internal combustion engine stops, the lead-acid battery 20 and the lithium battery 30 supply the electric power to the electrical loads 41, 42, and 43. The power source apparatus according to the eighth embodiment is equipped with a protection control means (not shown). This protection control means controls a discharged capacity and a charged capacity so as to keep the electric energy of the battery within the use range of SOC (state of charge) of the battery such as the lead-acid battery 20 and the lithium battery 30, where the SOC is a ratio of a charged energy to a full charged energy of the battery, the above discharged capacity is the electric capacity supplied from the lead-acid battery 20 and the lithium battery 30 to the electrical loads 41, 42, and 43, and the above charged capacity is the electric energy supplied from the alternator 10 to the lead-acid battery 20 and the lithium battery 30.

In the eighth embodiment, the alternator 10 generates the electric power by the regenerative energy of the vehicle which is generated when the vehicle speed is reduced. The regenerative electric power is charged to the lead-acid battery 20 and the lithium battery 30 (mainly to the lithium battery 30). Such a regenerative electric power is obtained only when the vehicle speed is reduced in the deceleration state and a fuel injection to the internal combustion engine is stopped.

The lead-acid battery 20 is a known usual battery. Specifically, the lead-acid battery 20 is composed of a plurality of cells connected in series and an electrolytic solution. Each of the cells in the lead-acid battery 20 has a positive electrode, and a negative electrode. Lead dioxide ($PbO_2$) is used as the positive electrode active material, lead (Pb) is used as the negative electrode active material, and sulfuric acid ($H_2SO_4$) is used as the electrolytic solution. In general, the lead-acid battery 20 is larger in charging capacity than the lithium battery 30.

On the other hand, the lithium battery 30 uses oxide containing lithium (for example, lithium metal composite oxide) as the positive electrode active material and/or adsorption material (for example, activated carbon) as the positive electrode. Specifically, $LiCoO_2$, $LiMn_2O_4$, $LiNiO_2$, $LiFePO_4$, etc. are used as the positive electrode active material. Further, the lithium battery 30 uses carbon, graphite, lithium-doped carbon or graphite, lithium titanium oxide (for example, $Li_2TiO_2$), or alloy which contains Si or Sn as the negative electrode active material. The lithium battery 30 contains an organic electrolyte as electrolytic solution. Like the structure of the lead-acid battery 20, the lithium battery 30 is composed of a plurality of cells having the above electrodes connected in series. In particular, the eighth embodiment uses lithium titanium oxide as the negative electrode active material in the lithium battery 30.

In FIG. 11A, FIG. 11B, and FIG. 11C, reference numbers 21 and 31 designate a battery cell assembly of the lead-acid battery 20 and a battery cell assembly of the lithium battery 30, respectively, and reference numbers 22 and 32 indicate an internal resistance of the lead-acid battery 20 and the lithium battery 30, respectively.

In the following explanation, an open circuit voltage V0 of the battery is a voltage generated by the battery cell assemblies 21 and 31. The terminal voltages Vd and Vc of the battery are voltages expressed by the following equation:

$$Vd = V0 - Id \times R \quad (F1); \text{ and}$$

$$Vc = V0 + Ic \times R \quad (F2),$$

where Id is a discharging current, Ic is a charging current, R is an internal resistance of the battery, and V0 is an open circuit voltage of the battery.

As shown in the equations (F1) and (F2), the more the internal resistance R increases, the more the terminal voltage Vd of the battery decreases when the battery discharges its capacity. Further, the more the internal resistance R increases, the more the terminal voltage Vc of the battery increases when the battery is charged.

Because the lead-acid battery 20 and the lithium battery 30 are connected in parallel, as shown in FIG. 11A, the induced current generated in the alternator 10 flows into the battery with a low terminal voltage during charging. On the other hand, the electric energy of the battery with a high terminal voltage is supplied to the electric load 40 during discharge.

During the regenerative mode of the vehicle, it is controlled for the terminal voltage Vd (Li) of the lithium battery 30 to be many times lower than the terminal voltage Vd (Pb) of the lead-acid battery 20 in order to preferentially charge the lithium battery 30 rather than the lead-acid battery 20. In addition, during the discharging mode, it is controlled for the terminal voltage Vd (Li) of the lithium battery 30 to be many times higher than the terminal voltage of the lead-acid battery 20 in order to preferentially discharge the electric energy from the lithium battery 30 rather than the lead-acid battery 20, where the terminal voltage Vd (Pb) of the lead-acid battery 20 is the voltage obtained by subtracting the barrier voltage Vbar of the parasitic diode from the terminal voltage Vd (Pb).

The above control can be achieved by adjusting the open circuit voltage V0 and the internal resistance R of each of the lead-acid battery 20 and the lithium battery 30. That is, the open circuit voltage V0 of the battery can be adjusted by selecting an optimum positive electrode active material, an optimum negative electrode active material, and an optimum electrolytic solution of the lithium battery 30.

A description will now be given of the method of setting the condition to satisfy the relationship of Vc (Li: Lithium battery)<Vc (Pb: lead-acid battery) during a regenerative energy charging and the condition to satisfy the relationship of Vd (Li)>Vd (Pb) during discharge, in the power source apparatus according to the eighth embodiment with reference to FIG. 12A, FIG. 12B, and FIG. 13.

Figure 12A:
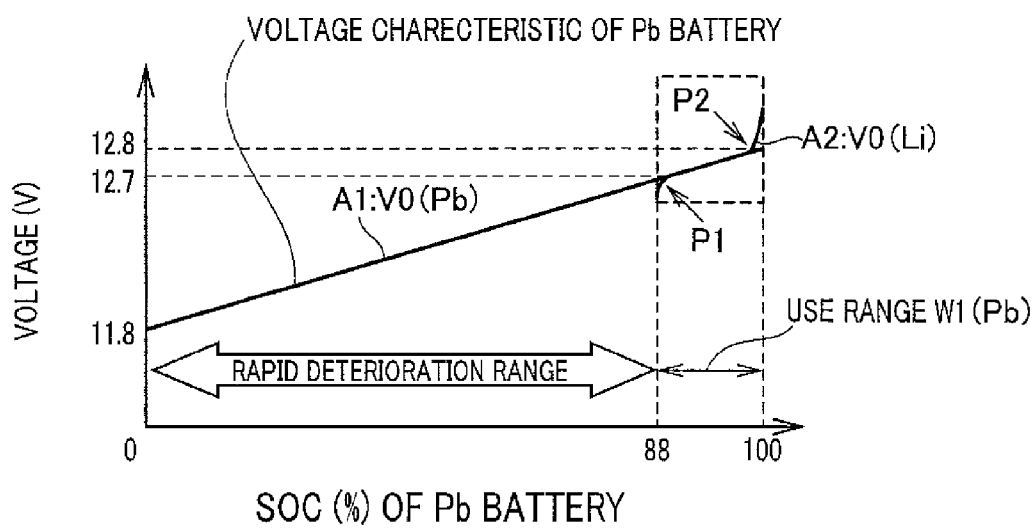
FIG. 12A is a view showing a use range of SOC of a lead-acid battery mounted to a vehicle with the power source apparatus according to the eighth embodiment of the present invention.
Figure 12B:
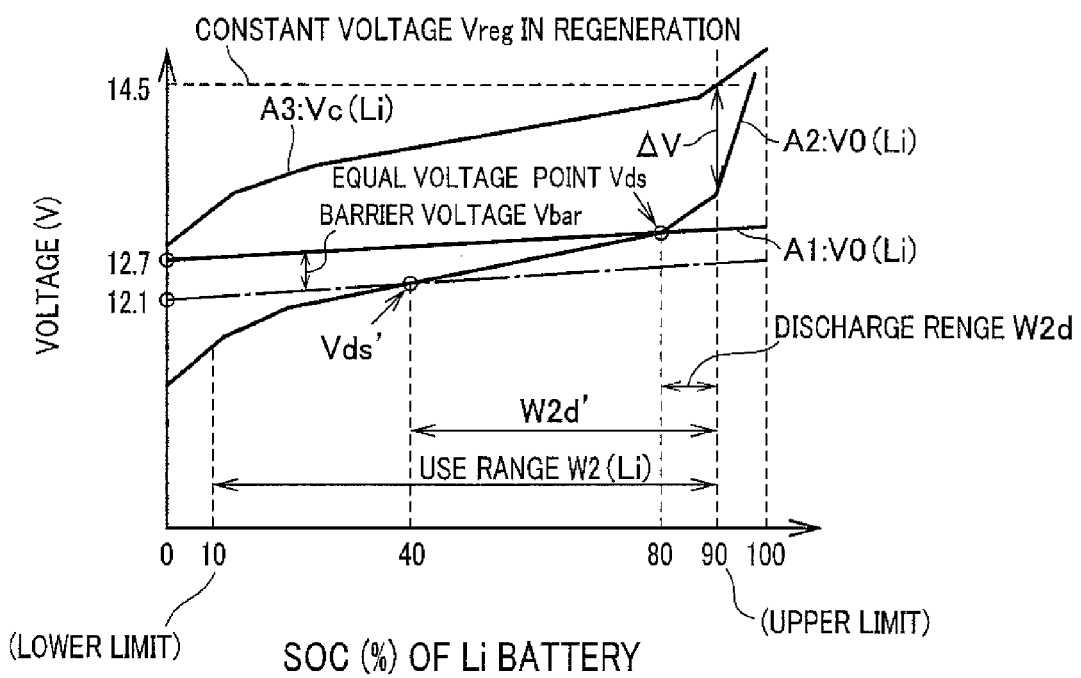
FIG. 12B is a view showing a use range of SOC of a lithium battery mounted to the vehicle with the power source apparatus according to the eighth embodiment of the present invention.

FIG. 12A is a view showing a use range of SOC of the lead-acid battery 20 in the power source apparatus according to the eighth embodiment. FIG. 12B is a view showing a use range of SOC of the lithium battery 30 in the power source apparatus according to the eighth embodiment.

In FIG. 12A, the horizontal line designates the SOC of the lead-acid battery 20, the solid line A1 denotes a voltage characteristic line which shows a relationship between the SOC and the open circuit voltage V0 (Pb) of the lead-acid battery 20. As shown in FIG. 12A, the more the SOC increases by increasing the charged energy, the more the open circuit voltage V0 (Pb) increases.

In FIG. 12B, the horizontal line designates the SOC of the lithium battery 30, the solid line A2 denotes a voltage characteristic line which shows a relationship between the SOC and the open circuit voltage V0 (Li) of the lithium battery 30. The more the SOC increases by increasing the charged energy, the more the open circuit voltage V0 (Li) increases. In particular, although the SOC increases according to the increase of the charged energy, the slope which shows the voltage characteristic line of the lead-acid battery 20 becomes low during a range between inflection points P1 and P2 shown in FIG. 12A.

The overcharged state and the over discharged state of each of the lead-acid battery 20 and the lithium battery 30 would cause a rapid deterioration thereof. Accordingly, it is necessary for the protection control means, previously described, to control the charging capacity to the lithium battery 30 and the lead-acid battery 20, and the discharging capacity from the lead-acid battery 20 and the lithium battery 30, that is, to use each of the lead-acid battery 20 and the lithium battery 30 within the use range of SOC.

The use range W1 (Pb) of SOC of the lead-acid battery 20 is within a range of 88% to 100%. On the other hand, the use range W2 (Li) of SOC of the lithium battery 30 is within a range of 10% to 90%. The upper limit of the use range W2 (Li) of SOC of the lithium battery 30 is smaller than 100%, and the lower limit of the use range W2 (Li) of SOC of the lithium battery 30 is larger than zero %.

Accordingly, the range of 0% to 88% of SOC of the lead-acid battery 20 causes the rapid deterioration. FIG. 12B also shows an expansion of the area indicated by the dotted line shown in FIG. 12A which indicates the use range W1 (Pb) of SOC of the lead-acid battery 20. The position at 0% of SOC of the lithium battery 30 indicated by the horizontal line in FIG. 12B corresponds to the position of 88% of the use range W1 (Pb) of SOC of the lead-acid battery 20.

The lithium battery 30 is set in order to obtain the voltage characteristic A2 of the lithium battery 30 which satisfies the following conditions (a'), (b'), (c'), (d'), and (e'). Specifically, it is possible to obtain the voltage characteristic A2 which satisfies the conditions (a'), (b'), (c'), (d'), and (e') by selecting an optimum combination of the positive electrode active material, the negative electrode active material, and the solid electrolyte of the lithium battery 30.

<Condition (a')>

There is the equal voltage point Vds at which the open circuit voltage V0 (Pb) of the lead-acid battery 20 is equal to the open circuit voltage V0 (Li) of the lithium battery 30 in the use range W1 (Pb) of SOC of the lead-acid battery 20 and the use range W2 (Li) of SOC of the lithium battery 30. The equal voltage point Vds is present in the range between the inflection points P1 and P2, where a slope of voltage characteristic line A2 of the lithium battery 30 in this range is small. In particular, the equal voltage point at which the lithium battery 30 is equal in open circuit voltage to the lead-acid battery 20 is shifted toward the lower limit side of SOC of the lithium battery 30 by the barrier voltage Vbar (see Vds' shown in FIG. 12B). In other words, the voltage characteristic line A1 of the lead-acid battery 20 is shifted toward the low voltage side as indicated by the alternate long and dash line shown in FIG. 12B.

<Condition (b')>

The open circuit voltage V0 (Li) of the lithium battery 30 is higher than the voltage, which is obtained by subtracting the barrier voltage Vbar of the parasitic diode 51 from the open circuit voltage V0 (Pb), at the upper limit side of the equal voltage point Vds' in the use range W2 (Li) of SOC of the lithium battery 30. In more detail, the equal voltage point Vds' is present at the lower limit side rather than the upper limit side (90%) of the use range W2 (Li) of SOC of the lithium battery 30 in order to set the equal voltage point Vds' within the range of P1 and P2. The slope of the voltage characteristic line A2 of the lithium battery 30 is larger than the slope of the voltage characteristic line A1 of the lead-acid battery 20 at the upper limit side of the equal voltage point Vds' in the use range W2 (Li) of SOC of the lithium battery 30.

<Condition (c')>

The terminal voltage Vc (Li) of the lithium battery 30 when the maximum charging current flows in the lithium battery 30 is smaller than the constant voltage Vreg which is controlled by the regulator 11. In other words, the terminal voltage Vc (Li) of the lithium battery 30, as the terminal voltage Vc (Li) (see the solid line A3 shown in FIG. 12B) when the lithium battery 30 is charged, at the upper limit value (90%) of the use range W2 (Li) of SOC of the lithium battery 30, is smaller than the constant voltage Vreg. Reference character ΔV shown in FIG. 12B indicates a voltage drop part by the internal resistance 32 at the upper limit value (90%), which corresponds to the term (Ic×R) in the equation (F2), previously described.

<Condition (d')>

The open circuit voltage V0 (Li) of the lithium battery 30 is lower than the open circuit voltage V0 (Pb) of the lead-acid battery 20 in the lower limit side from the equal voltage point Vds' in the use range W2 (Li) of SOC of the lithium battery 30. In more detail, the equal voltage point Vds' is set to a value at the upper limit side from the lower limit side (10%) of the use range W2 (Li) of SOC of the lithium battery 30 in order to set the equal voltage point Vds' in the range of P1 to P2.

In the range in the lower limit side observed from the equal voltage point Vds' in the use range W2 (Li) of SOC of the lithium battery 30, the slope of the voltage characteristic line A2 of the lithium battery 30 is larger than the slope of the voltage characteristic line A1 of the lead-acid battery 20.

<Condition (e')>

The range in the upper limit side observed from the equal voltage point Vds' is wider than the range in the lower limit side observed from the equal voltage point Vds' in the use range W2 (Li) of SOC of the lithium battery 30. In more detail, the equal voltage point Vds' is set to a value at the lower limit side from the intermediate point between the range of P1 and p2 in order to set the equal voltage point Vds' in the range of P1 to P2. This satisfies the relationship of Vd (Li)>Vd (Pb)−Vbar in a large part in the use range W2 (Li) of SOC of the lithium battery 30.

Figure 13:
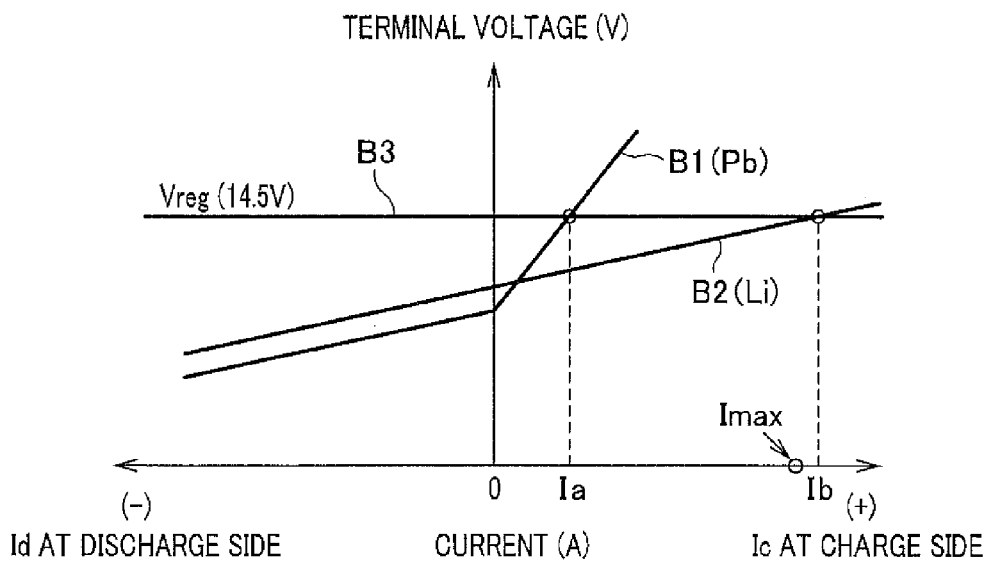
FIG. 13 is a view showing a difference in I-V characteristics between the lead-acid battery and the lithium battery in the power source apparatus according to the first embodiment of the present invention.

FIG. 13 is a view showing a difference in I-V characteristics between the lead-acid battery 20 and the lithium battery 30 in the power source apparatus according to the first embodiment. In FIG. 13, the solid line B1 indicates the I-V characteristic of the lead-acid battery 20, the solid line B2 designates the I-V characteristic of the lithium battery 30, the solid line B3 denotes the constant voltage Vreg, the horizontal line indicates the current value Ic and the current value Id, the vertical line indicates the terminal voltage Vc and the terminal voltage Vd. In FIG. 13, the current Ic during charge is expressed by a positive value, and the current Id during discharging is expressed by a negative value.

In the I-V characteristics B1 and B2, the more the charging current Ic increases, the more the terminal voltage Vc increases (Ic×R is increased). The more the charging current Id decreases, the more the terminal voltage Vd decreases (Ic×R is decreased). That is, the change of the charging current Ic is in proportion to the change of the charging current Ic. The slope of each of the I-V characteristics B1 and B2 indicates the internal resistance R. In particular, the lithium battery 30 has the same internal resistance value R (Pb) during both charge and discharge. On the other hand, an internal resistance value R (Pb) in charging of the lead-acid battery 20 is larger than that in discharging of the lead-acid battery 20.

In the eighth embodiment, it is set to satisfy the relationship of R (Li)<R (Pb) in charging, and to satisfy the relationship of R (Li)≤R (Pb) in discharging. It is also set to satisfy the relationship of Vd (Li)>Vd (Pb)-Vbar in discharging when the MOS FET 50' is turned off (on the other hand, to satisfy the relationship of Vd (Li)>Vd (Pb) when the MOS FET 50' is turned on), further to satisfy the relationship of Vc (Li)≥Vc (Pb) in a range which is close to Ic=zero during charging when the MOS FET 50' is turned on, and to satisfy the relationship of Vc (Li)<Vc (Pb) in other part (Vc (Li)+Vbar<Vc (Pb)) when the MOS FET 50' is turned off). The above setting control can be achieved by the condition where the internal resistance value R (Li) of the lithium battery 30 is smaller than the internal resistance value R (Pb) of the lead-acid battery 20 in charging.

The power source apparatus having the above structure according to the eighth embodiment of the present invention has the following features (B1) to (B12).

(B1) Making the voltage characteristic A2 to satisfy the condition (a') (the equal voltage point Vds is present in the range between the inflection points P1 and P2, and the equal voltage point Vds' is present when the MOS FET 50' is turned on) generates the state without any large voltage difference between the lithium battery 30 and the lead-acid battery 20 because the terminal voltage Vd (Li) in the use range of SOC of the lithium battery 30 is approximately equal to the terminal voltage Vd (Pb) in the use range W1 of SOC of the lead-acid battery 20 during discharging, as shown in FIG. 12A.

Therefore even if does not use any DC/DC converter (which is used in the conventional power source apparatus) and the MOS FET 50' is turned on, it is possible to suppress a current from the lithium battery 30 to the lead-acid battery 20, in other words, it is possible to flow a current corresponding to an extremely small capacity from the battery having a high voltage to the battery having a low voltage in the lithium battery 30 and the lead-acid battery 20. The structure of the power source apparatus according to the eighth embodiment can thereby suppress the lithium battery 30 and the lead-acid battery 20 from being in overcharge and over discharge without using any DC/DC converter. This makes it possible to adequately reduce the manufacturing cost of the power source apparatus because of using no DC/DC converter.

(B2) Making the voltage characteristic A2 to satisfy the condition (b') (the relationship of Vd (Li)>Vd (Pb)−Vbar at the upper limit side from the equal voltage point Vds') to the voltage characteristic A1 allows the lithium battery 30 to discharge a current to the electric load 43 which requires a constant voltage, because the open circuit voltage of the lithium battery 30 is higher than that of the lead-acid battery 20, in the state where the lithium battery 30 is charged higher rather than the capacity at the equal voltage point Vds' in the use range W2 (Li) of SOC of the lithium battery 30.

Because this condition increases the frequency of discharging a current from the lithium battery 30 when compared with from the lead-acid battery 20 and decreases the frequency of discharging a current from the lead-acid battery 20 with a low durability to a frequent discharging, this makes it possible to suppress deterioration of the lead-acid battery 20.

In the structure where the electric load 42 is placed in position at the lithium battery 30 side observed from the MOS FET 50', and the lithium battery 30 supplies the electric energy (capacity) to the electric load 42, it is possible to preferentially discharge the electric energy from the lithium battery 30 rather than the lead-acid battery 20 when the voltage characteristic A2 is made in order to satisfy the above condition (b').

(B3) Making the voltage characteristic A2 to satisfy the condition (c') (Vc (Li)<Vreg when the maximum charging current flows) to the voltage characteristic A1 can increase the frequency of charging the lithium battery 30 rather than the lead-acid battery 20 by the following reasons.

In the case of charging the lead-acid battery 20 with the regenerative energy without using the lithium battery 30, because the internal resistance 22 of the lead-acid battery 20 is larger than that of the lithium battery 30, as shown in FIG. 13, the terminal voltage Vc (Pb) of the lead-acid battery 20 reaches the constant voltage Vreg at the point when the charging current reaches the current value Ia.

On the other hand, the structure of the power source apparatus equipped with the lithium battery 30 satisfies the relationship of Vc (Li)<Vreg even when the charging current becomes the maximum value, it is possible to further charge the lithium battery 30.

In the example shown in FIG. 13, the terminal voltage Vc (Li) of the lithium battery 30 reaches the constant voltage Vreg when the charging current reaches the current value Ib which is larger than the maximum charging current Imax.

Figure 14A:
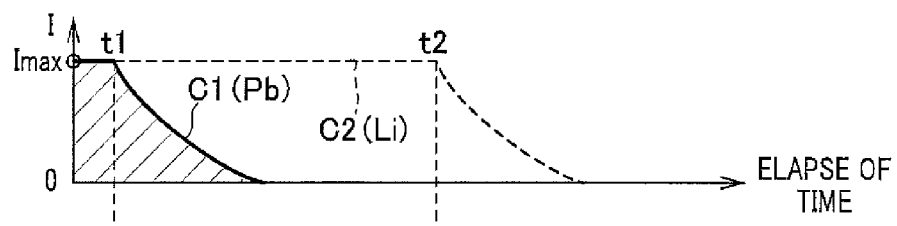
FIG. 14A and FIG. 14B show a change of a current and a terminal voltage of the lead-acid battery and the lithium battery.
Figure 14B:
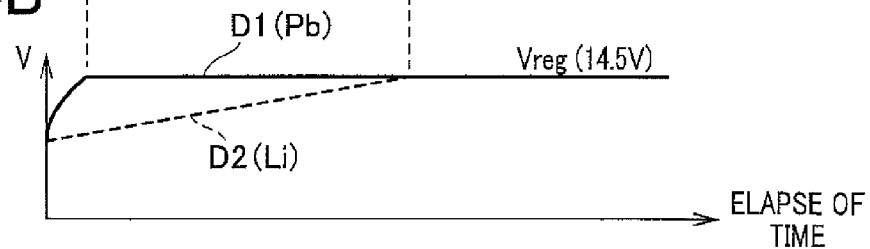

This will be explained in detail with reference to FIG. 14A and FIG. 14B. FIG. 14A shows a current change of the lead-acid battery 20 and the lithium battery 30 in the elapse of time. FIG. 14B shows a terminal voltage change of the lead-acid battery 20 and the lithium battery 30 in the elapse of time. In FIG. 14A and FIG. 14B, the solid lines C1 and D1 indicate the change of the charging current and the terminal voltage Vc (Pb) when the lead-acid battery 20 is charged with the regenerative electric power at the maximum charging current Imax without using the lithium battery 30. The solid lines C2 and D2 in FIG. 14A and FIG. 14B show the change of the charging current and the change of the terminal voltage Vc (Li), respectively, when the lithium battery 30 is charged with the regenerative electric power at the maximum charging current Imax in the power source apparatus according to the eighth embodiment.

As previously explained with reference to FIG. 13, because the relationship of Imax>Ia is satisfied when the lead-acid battery 20 is charged with the regenerative electric power, the charging current rapidly drops at the timing t1 and converges to zero, as shown in FIG. 14A. This state would be difficult to charge the lead-acid battery 20. In this case, the area designated by slanting lines in FIG. 14A corresponds to the charged capacity of the lead-acid battery 20.

On the other hand, because the relationship of Imax≤Ib is satisfied when the lithium battery 30 is charged with the regenerative electric power, the charging current maintains the value Imax until the timing t2 where SOC of the lithium battery 30 reaches the upper limit value (90%). This allows the lithium battery 30 to be always charged and to increase the quantity of chargeable capacity.

As described above, according to the eighth embodiment of the present invention, it is possible to increase the frequency to charge the lithium battery 30 rather than the frequency to charge the lead-acid battery 20. This can decrease the accumulated charged capacity of the lead-acid battery 20 which has a low durability, and suppress the deterioration of the lead-acid battery 20.

(B4) Making the voltage characteristic A2 to satisfy the condition (d') (Vd (Li)<Vd (Pb) at the lower limit side from the equal voltage point Vds') to the voltage characteristic A1 allows the lead-acid battery 20, instead of the lithium battery 30, to discharge the electric power to the electrical loads 40 when the lithium battery 30 preferentially discharges the electric power (capacity) to the electric load 40 and the SOC of the lithium battery 30 is lower than the equal voltage point Vds'.

Further, the current flows from the lead-acid battery 20 to the lithium battery 30, this increases the SOC of the lithium battery 30 toward the equal voltage point Vds'. As a result, it is possible to suppress the lithium battery 30 from over discharge.

(B5) Making the voltage characteristic A2 to satisfy the condition (e') to the voltage characteristic A1 allows the range to satisfy the relationship of Vd (Li)>Vd (Pb)−Vbar based on the condition (b'), where the condition (e') satisfies that the range at the upper limit side from the equal voltage point Vds' is wider in area than the range at the lower limit side from the equal voltage point Vds'. This makes it possible to increase the frequency to preferentially discharge from the lithium battery 30 rather than from the lead-acid battery 20. This makes it possible to increase the effect of the deterioration resistance of the lead-acid battery 20.

(B6) The power source apparatus according to the eighth embodiment has the MOS FET 50', previously explained. The presence of the MOS FET 50' shifts the equal voltage point (Vds--->Vds') toward the lower limit side by the barrier voltage Vbar of the parasitic diode 51, where the open circuit voltage of the lithium battery 30 is equal to the open circuit voltage of the lead-acid battery 20 at the equal voltage point. In other words, the voltage characteristic line A1 of the lead-acid battery 20 is apparently shifted toward the lower limit voltage as designated by the long and dash line shown in FIG. 12B. This makes it possible to expand the area (discharging area W2d), as designated by W2d', in the upper limit side observed from the equal voltage point Vds' in the use range W2 (Li) of SOC of the lithium battery 30, and further to increase the frequency of discharging the energy from the lithium battery 30, rather than from the lead-acid battery 20, to the electric load 43 which requires a constant voltage.

(B7) In general, the starter motor 41 requires a large electric power when it starts to operate, when compared with other electric loads 42 and 43. Supplying a large electric power from the lithium battery 30 to the electric load such as the starter motor 41 prevents the size reduction of the lithium battery 30 which is a high price rather than that of the lead-acid battery 20.

In the eighth embodiment, the lead-acid battery 20 supplies a large electric power to the starter motor 41 which consumes a large energy when it starts to operate in order to reduce the size and capacity of the lithium battery 30. Still further, because the forward direction of the parasitic diode 51 in the MOS FET 50' is set to the current direction from the lead-acid battery 20 to the lithium battery 30, this structure can prevent the current from flowing to the starter motor 41 from the lithium battery 30. Moreover, because the MOS FET 50' is turned off during the operation of the starter motor 41, it is possible to reliably prevent the current from flowing to the starter motor 41 from the lithium battery 30.

(B8) When the lithium battery 30 is charged with the electric power generated by the alternator 10, it is necessary to turn on the MOS FET 50'. The charging current, that is, a generated current in the alternator 10 flows into the lithium battery 30 by bypassing the parasitic diode 51. Bypassing the parasitic diode 51 can avoid the energy loss to be caused by the parasitic voltage Vbar of the parasitic diode 51, it is possible to decrease the energy loss generated by the alternator 10. In particular, because the MOS FET 50' is turned on when the lithium battery 30 is charged with the regenerative energy generated in the alternator 10, it is possible to decrease the energy loss which is caused when a large regenerative current flows through the parasitic diode 51. This is one of superior features of the present invention.

(B9) When the conditions (a'), (b'), and (c'), previously described, are satisfied under the use of lithium phosphate (which serves as positive electrode material) and graphite (which serves as negative electrode material) as a combination of the positive electrode material and the negative electrode material of the lithium battery 30, it is necessary to increase the electrode area of the lithium battery 30 because the lithium phosphate has a large internal resistance rather than other materials.

In order to avoid this drawback, the power source apparatus according to the present invention uses lithium cobalt oxide, lithium manganese oxide or lithium nickelate compound as the positive electrode material, and lithium titanium oxide as the negative electrode material. This makes it possible to reduce the size and cost of the lithium battery 30 while satisfying the conditions (a'), (b'), and (c').

The use of lithium titanium oxide as the negative electrode material, when compared with using graphite, would cause a drawback to shift the equal voltage point Vds toward the upper limit side, where the open circuit voltage of the lithium battery 30 is equal to the open circuit voltage of the lead-acid battery 20 at the equal voltage point Vds. However, the structure of the power source apparatus according to the eighth embodiment can solve it because it has the MOS FET 50' which is capable of shifting the equal voltage point Vds toward the lower limit side (Vds--->Vds'). Accordingly, the power source apparatus according to the present invention can solve the above drawbacks and also decrease the electrode area of the lithium battery 30.

(B10) The lithium battery 30 supplies the electric capacity (energy) to the electrical loads 43 which require an approximate constant voltage or a stable voltage which is changed within the predetermined voltage range, and the lead-acid battery 20 supplies the electric power to the starter motor 41. While the lead-acid battery 20 supplied the electric power to the starter motor 41, the MOS FET 50' is turned off. This makes it possible to supply to the electrical loads 43 the electric power whose voltage has a small fluctuation in voltage.

(B11) Adding the lithium battery 30 which satisfies the conditions (a') to (e') into an power source apparatus which is comprised of the alternator 10, the regulator 11, and the lead-acid battery 20 makes it possible to obtain the features of the present invention, previously described, without using any DC/DC converter. It is possible to realize the power source apparatus according to the eighth embodiment of the present invention by using a conventional power source apparatus with a less change in hardware design.

(B12) The power source apparatus according to the eighth embodiment uses the MOS FET 50' which serves the open and close means and the rectifying means. Because the parasitic diode 51 (which is always formed in the MOS FET 50') serves as the rectifying means, it is not necessary to add any additional diode as the dedicated rectifying means.

Ninth Embodiment

Figure 15:
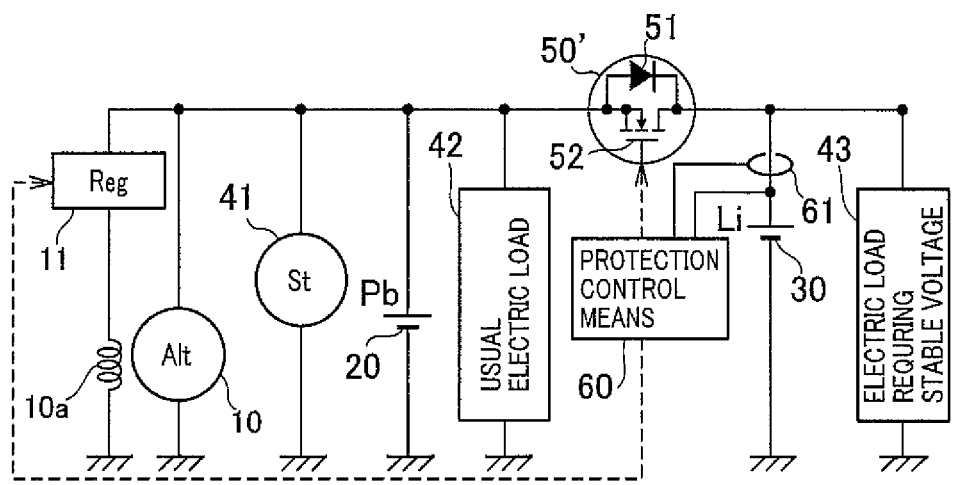
FIG. 15 is a block diagram showing a schematic electric circuit of a power source apparatus for vehicle according to a ninth embodiment of the present invention.

A description will be given of the power source apparatus according to the ninth embodiment of the present invention with reference to FIG. 15. FIG. 15 is a block diagram showing a schematic electric circuit of the power source apparatus according to the ninth embodiment.

The power source apparatus according to the ninth embodiment has a protection control means 600 which controls the charging capacity to and discharging capacity from the lithium battery 30 in order to avoid overcharge to the lithium battery 30 and over discharge from the lithium battery 30.

The protection control means 600 controls the input signal which is transferred to the gate of the semiconductor switch part 52 in order to switch on-state and off-state of the MOS FET 50', like the open and close control means 601 disclosed in the eighth embodiment, previously described, The protection control means 600 always receives detection signals regarding the terminal voltages Vc and Vd or the open circuit voltage V0 (Li) of the lithium battery 30, and a detection signal regarding the current transferred from a current detection means 61 which detects a current which flows in the lithium battery 30.

The protection control means 600 instructs the MOS FET 50' to open when the terminal voltage Vd of the lithium battery 30 during discharging becomes below the lower limit voltage. This control protects the lithium battery 30 from over discharge. It is possible to set the lower limit voltage based on a voltage which corresponds to the lower limit SOC value (10%) shown in FIG. 12B.

When the terminal voltage Vc of the lithium battery 30 during charge exceeds the upper limit voltage, the protection control means 600 instructs the MOS FET 50' to turn off (voltage rise suppression operation). This control protects the lithium battery 30 from overcharge. It is possible to set the upper limit voltage based on a voltage which corresponds to the upper limit SOC value (90%) shown in FIG. 12B.

The protection control means 600 further outputs an instruction signal to the regulator 11 to change the constant voltage Vreg of the regulator 11 according to the voltage of the lithium battery 30. This makes it possible to protect the lithium battery 30 from overcharge and over discharge.

That is, the protection control means 600 instructs the regulator 11 to increase the constant voltage Vreg when the voltage of the lithium battery 30 becomes lower than the lower limit value. This increases the charge capacity to the lithium battery 30 and protects the lithium battery 30 from over discharge.

On the other hand, the protection control means 600 instructs the regulator 11 to decrease the constant voltage Vreg when the voltage of the lithium battery 30 exceeds the upper limit value. This suppresses the charge capacity to the lithium battery 30, and protects the lithium battery 30 from overcharge.

As describe above, the power source apparatus according to the ninth embodiment of the present invention reliably prevent the lithium battery 30 from over discharge because the protection control means 600 instructs the MOS FET 50' to turn on when the terminal voltage of the lithium battery 30 becomes lower than the use range W2 (Li) of the lithium battery 30 in addition during the supply of the electric power to the starter motor 41.

Further, the power source apparatus according to the ninth embodiment of the present invention reliably avoids the lithium battery 30 from overcharge because the protection control means 600 instructs the MOS FET 50' to turn off.

Because the power source apparatus according to the ninth embodiment of the present invention performs the over discharge and overcharge protection operation by changing the constant voltage Vreg by the protection control means 600. This can precisely control the voltage of the lithium battery 30, and this makes thereby it possible to perform the over discharge protection and the overcharge protection for the lithium battery 30 with high accuracy.

Tenth Embodiment

Figure 16:
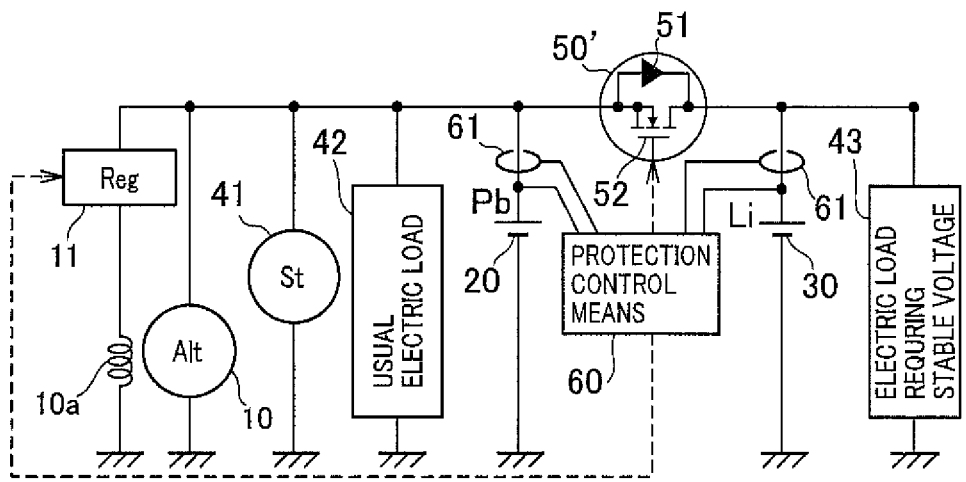
FIG. 16 is a block diagram showing a schematic electric circuit of a power source apparatus for vehicle according to a tenth embodiment of the present invention.

A description will be given of the power source apparatus according to the tenth embodiment of the present invention with reference to FIG. 16. FIG. 16 is a block diagram showing a schematic electric circuit of the power source apparatus according to the tenth embodiment.

In the ninth embodiment, the power source apparatus has the protection control means 600 to protect the lithium battery 30 from overcharge and over discharge, previously described. In the tenth embodiment, the protection control means 600 further performs the overcharge and over discharge operation for the lead-acid battery 20 in addition to the function of the ninth embodiment.

That is, the protection control means 600 instructs the regulator 11 to increase the constant voltage Vreg when the voltage of the lead-acid battery 20 becomes under the lower limit voltage. This performs the over discharge operation of the lead-acid battery 20. On the other hand, the protection control means 600 instructs the regulator 11 to decrease the constant voltage Vreg when the voltage of the lead-acid battery 20 exceeds the upper limit voltage. This performs the overcharge operation of the lead-acid battery 20.

As describe above, the power source apparatus according to the tenth embodiment of the present invention correctly changes the constant Vreg according to the voltage of the lead-acid battery 20, in addition to changing the constant voltage Vreg according to the voltage of the lithium battery 30. This can precisely control the voltage of the lead-acid battery 20 in addition to the voltage of the lithium battery 30, and makes thereby it possible to perform the over discharge protection and the overcharge protection for the lead-acid battery 20 as well as the lithium battery 30 with high accuracy.

Eleventh Embodiment

Figure 17:
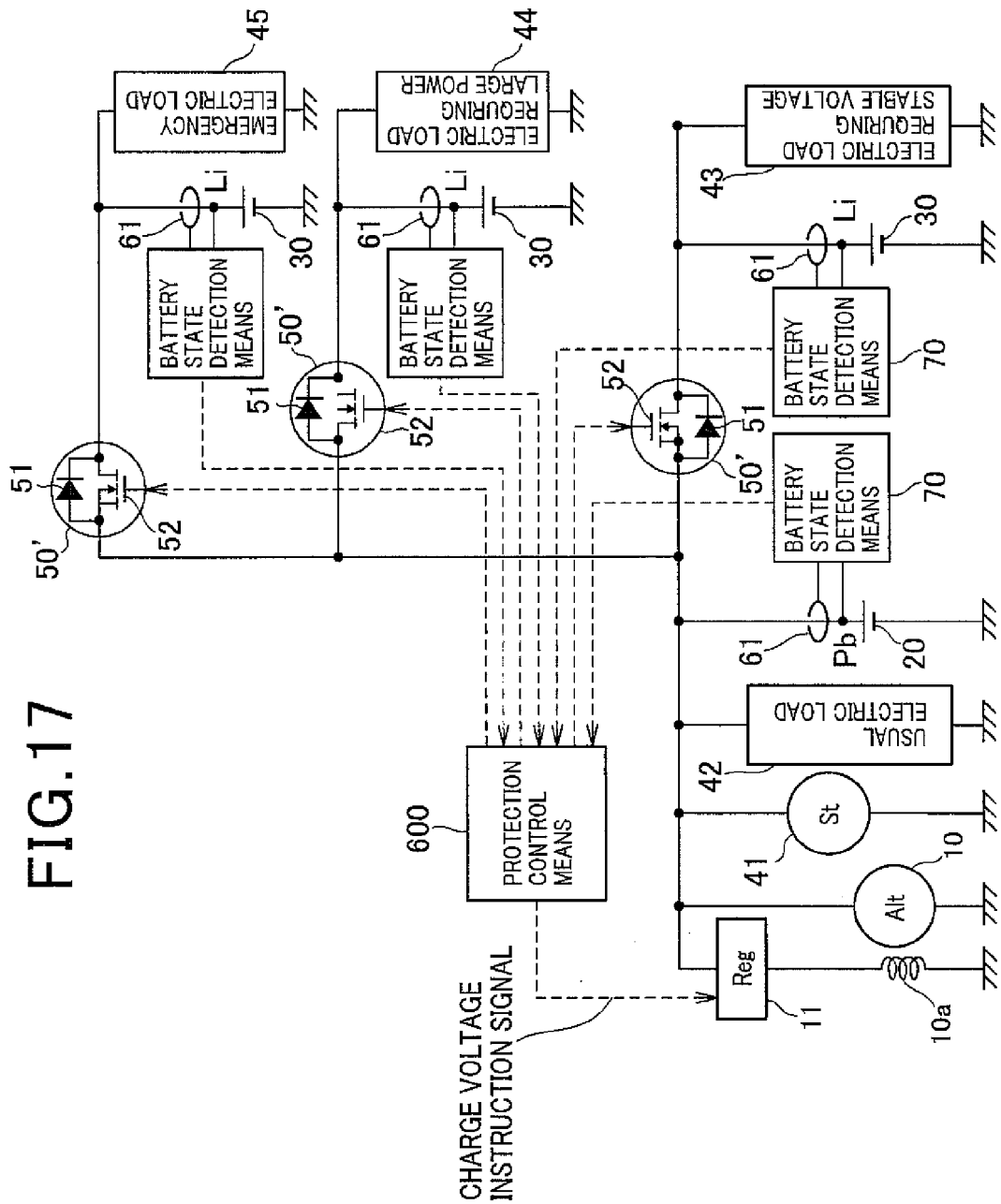
FIG. 17 is a block diagram showing a schematic electric circuit of a power source apparatus for vehicle according to an eleventh embodiment of the present invention.

A description will be given of the power source apparatus according to the eleventh embodiment of the present invention with reference to FIG. 17. FIG. 17 is a block diagram showing a schematic electric circuit of the power source apparatus according to the eleventh embodiment.

The power source apparatus according to the eleventh embodiment has a plurality of the lithium batteries 30. In the structure of the power source apparatus according to the eleventh embodiment, the electric power is supplied from the different lithium batteries 30 to various types of the electric loads 43, 44, and 45, where the electrical loads 43 require an approximate constant voltage or a stable voltage which varies within the predetermined voltage range, the electric loads 44 require a large electric power, and the electric load 45 requires a voltage in order to reliably operate when an emergency occurs.

Specifically, there is an electric motor mounted to a power steering apparatus as one example of the electric load 44 which requires a large quantity of the electric power. The electric load 44 can operate with some fluctuating voltage, which is different from the electrical loads 43 which require an approximate constant voltage, previously described.

There is a communication apparatus as one example of the electric load 45 which requires a certain operation when an emergency occurs. This communication apparatus transmits abnormal information to a repair operator in a car dealership to repair the vehicle, for example, when the internal combustion engine mounted to the vehicle causes a failure and does not start to operate. Therefore it is not necessary for such a type of the electric load 44 to use a large electric power and a constant voltage.

The power source apparatus according to the eleventh embodiment shown in FIG. 17 has a plurality of the MOS FETs 50', the battery state detection means 70, and the current detection means 61, like the power source apparatus shown in FIG. 15. That is, the MOS FETs 50', the battery state detection means 70, and the current detection means 61 are placed every lithium battery 30.

The battery state detection means 70 always detects the terminal voltages Vc, Vd or the open circuit voltage V0 (Li) of each of the lithium batteries 30, and a current flowing through each of the lithium batteries 30. The battery state detection means 70 then transfers the detection signals to the protection control means 600. The protection control means 600 receives the detection signals transferred from the battery state detection means 70, and performs the overcharge control and the over discharge control by using the MOS FETs 50', and also performs the overcharge and over discharge protection control by adjusting the constant voltage Vreg, like the protection control means 600 shown in FIG. 15.

The electric load 43, the electric load 44, and the electric load 45 are electrically connected to the MOS FETs 50' at the lithium batteries 30 side, not at the lead-acid battery 20 side, observed from the MOS FETs 50' side. This structure makes it possible to supply necessary electric power from the lithium batteries 30 to the corresponding electric loads 43, 44, and 45, respectively.

As describe above, the power source apparatus according to the eleventh embodiment of the present invention has a plurality of the lithium batteries 30. The lithium batteries 30 correspond to the electrical loads, respectively. This structure makes it possible to suppress the deterioration of each of the lithium batteries 30. In particular, because the electric load 45 for emergency has the dedicated lithium battery 30, it is possible to suppress the deterioration of the lithium battery 30 and to avoid the risk of not supplying the electric power to the electric load 45.

Twelfth Embodiment

A description will be given of the power source apparatus according to the twelfth embodiment of the present invention with reference to FIG. 18.

Figure 18:
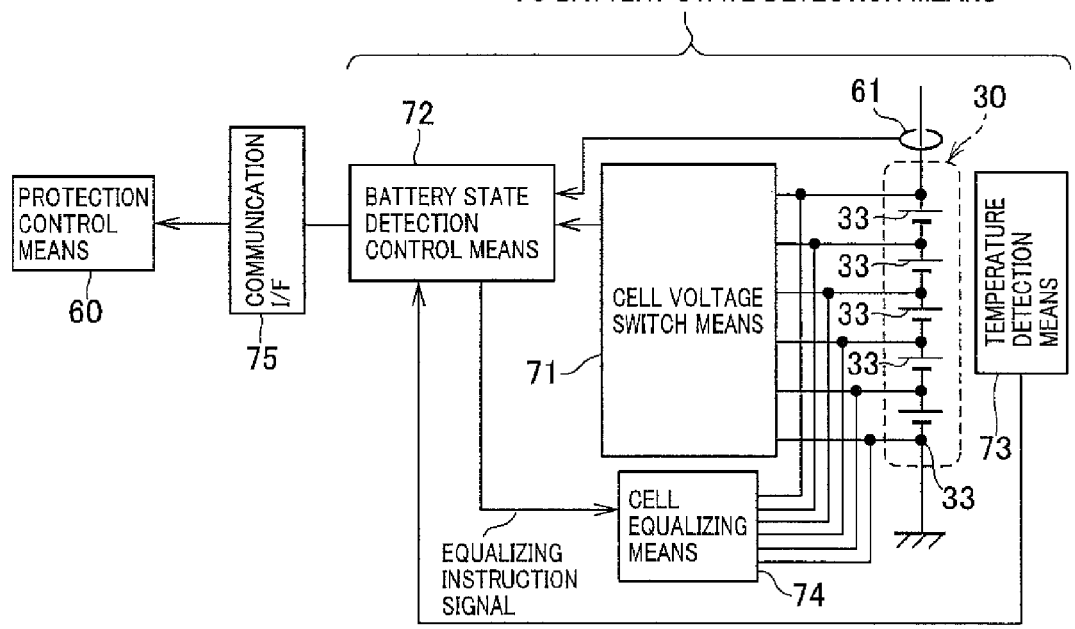
FIG. 18 is a block diagram showing a schematic electric circuit of a power source apparatus for vehicle according to a twelfth embodiment of the present invention.

FIG. 18 is a block diagram mainly showing a detailed structure of the battery state detection means 70 in the power source apparatus shown in FIG. 17.

The battery state detection means 70 is comprised of a cell voltage switch means 71, a battery state detection control means 72, a temperature detection means 73, and a cell equalizing means 74. The cell voltage switch means 71, the battery state detection control means 72, the temperature detection means 73, and the cell equalizing means 74 serve as equalizing means.

The cell voltage switch means 71 detects the voltage of each of a plurality of the battery cells 33 (the twelfth embodiment shows the fifth battery cells 33) which form the lithium battery 30. The cell voltage switch means 71 has a function to select one of the battery cells 33 in order to detect its voltage. The cell voltage switch means 71 detects the voltage of the selected battery cell and then transfers the detected voltage value to the battery state detection control means 72. The battery state detection control means 72 also receives a detected current value of the current which flows in the lithium battery 30. The battery state detection control means 72 further receives a temperature value of the lithium battery 30 detected by the temperature detection means 73.

The battery state detection control means 72 calculates the terminal voltages Vc, Vd or the open circuit voltage V0 (Li) of the lithium battery 30 based on the voltage of each of the battery cells 33. The battery state detection control means 72 transfers the calculated voltage, the current value of the lithium battery 30, and the temperature value of the lithium battery 30 to the protection control means 600 through the communication interface 75. The protection control means 600 receives the information such as the above voltage value, the current value, and the temperature value transferred from the battery state detection control means 72, and performs the protection control based on the received information.

The battery state detection control means 72 calculates a discharge capacity from the battery cell 33 having a high SOC, and a charge capacity for the battery cell 33 having a low SOC based on the received voltage value of the battery cell 33. The battery state detection control means 72 outputs an equalizing instruction signal corresponding to the calculation result to the cell equalizing means 74. When receiving the equalizing instruction signal, the cell equalizing means 74 instructs each of the battery cells 33 to discharge or charge based on the received equalizing instruction signal in order to equalize the SOC (state of charge as a residual electric energy) in each of the battery cells 33.

As describe above, the power source apparatus according to the twelfth embodiment of the present invention can equalize the SOC in each of the battery cells 33. This makes it possible to avoid the presence of the overcharged battery cells 33 and the battery cells having an adequate SOC during charging. Like this, it is also possible to avoid the presence of the over discharged battery cells 33 and the battery cells having an adequate SOC during discharging. The power source apparatus according to the eleventh embodiment can suppress the advance of deterioration of the lithium battery 30.

Thirteenth Embodiment

A description will be given of the power source apparatus according to the thirteenth embodiment of the present invention with reference to FIG. 19.

In the power source apparatus according to the twelfth embodiment shown in FIG. 18, the cell voltage switch means 71 and the battery state detection control means 72 are formed with different circuit parts. The power source apparatus according to the thirteenth embodiment has a single IC 710 (integrated circuit as cell equalizing abnormal detection means) which is composed of the cell voltage switch means 71 and the cell equalizing means 74.

Figure 19:
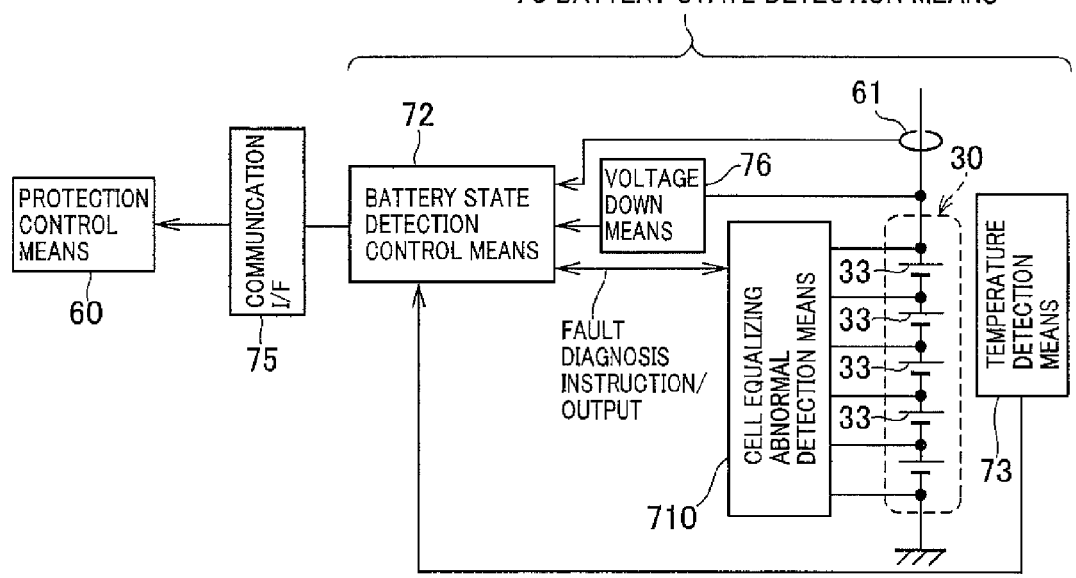
FIG. 19 is a block diagram showing a schematic electric circuit of a power source apparatus for vehicle according to a thirteenth embodiment of the present invention.

FIG. 19 is a block diagram mainly showing a detailed structure of the battery state detection means 70 comprised of the single IC chip 710 in the power source apparatus according to the thirteenth embodiment.

The cell equalizing abnormal detection means 710 detects the voltage of each of the battery cells 33, and calculates the charging capacity to or discharging capacity from each of the battery cells 33 based on the detected voltage. The cell equalizing abnormal detection means 710 equalizes the residual energy (or residual capacity) of each of the battery cells 33 by charging and discharging each of the battery cells 33 based on the calculation result.

The cell equalizing abnormal detection means 710 further detects whether or not the detected voltage of each of the battery cells 33 is within a predetermined normal range in order to detect the abnormality of each of the cell batteries 33. When receiving an abnormal diagnosis instruction signal transferred from the battery state detection control means 72, the cell equalizing abnormal detection means 710 starts to perform the abnormal detection operation previously described, and transfers the detection result to the battery state detection control means 72.

A voltage down means 76 decreases the voltage of the lithium battery 30 to a voltage of not more than 5 V, with which a microcomputer is operable. Such a voltage signal decreased by the voltage down means 76 is transferred to the battery state detection control means 72, and then further transferred to the protection control means 600 through the communication interface 75.

As described above, the power source apparatus according to the thirteenth embodiment of the present invention has the effect to perform the abnormal detection operation for each of the battery cells 33 in addition to have the same effects of the power source apparatus according to the twelfth embodiment.

Fourteenth Embodiment

A description will be given of the power source apparatus according to the fourteenth embodiment of the present invention with reference to FIG. 20.

Figure 20:
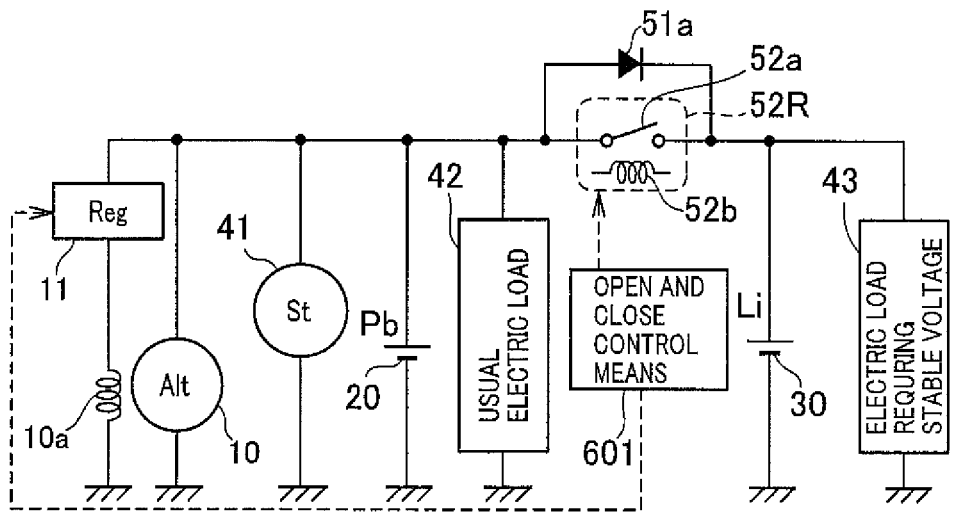
FIG. 20 is a block diagram showing a schematic electric circuit of a power source apparatus for vehicle according to a fourteenth embodiment of the present invention.

FIG. 20 is a block diagram showing a schematic electric circuit of the power source apparatus according to the fourteenth embodiment.

As shown in FIG. 20, the power source apparatus according to the fourteenth embodiment uses an electromagnetic relay 52R and a diode 51a connected in parallel, instead of the MOS FET 50'. In this structure, the electromagnetic relay 52R serves as the open and close means, and the diode 51a serves as the rectifying means. Like the parasitic diode 51 has a barrier voltage Vbar, the diode 51a also has a barrier voltage Vbar.

The open and close control means 601 allows a current to flow in an electromagnetic coil 52b and prevents the current from flowing in the electromagnetic coil 52b of the electromagnetic relay 52R in order to control the operation of the switch part 52a of the electromagnetic relay 52R.

In the fourteenth embodiment, when the open and close control means 601 allows the current to flow in the electromagnetic coil 52b, the switch part 52a of the electromagnetic relay 52R is turned on. This allows the lithium battery 30 to supply electric energy to the alternator 10 and the lead-acid battery 20.

On the other hand, when the open and close control means 601 prevents the current from flowing in the electromagnetic coil 52*b*, the switch part 52*a* of the electromagnetic relay 52R is turned off. This prevents the electric energy from being supplied from the lithium battery 30 to the alternator 10 and the lead-acid battery 20.

As described above, the structure of the power source apparatus according to the fourteenth embodiment has the same effects of that of the eighth embodiment.

There are the following differences between the eighth embodiment using the MOS FET 50' and the fourteenth embodiment using the electromagnetic relay 52R and the diode 51*a*:

That is, because the MOS FET 50' has the function of the open and close means and the function of the rectifying means, it is possible to decrease the size and the total number of the components which form the power source apparatus when the power source apparatus uses the MOS FET 50' when compared with the total number of the components in the power source apparatus which uses the electromagnetic relay 52R and the diode 51*a*, instead of the MOS FET 50'.

Further, it is possible for the semiconductor switch 52 to have a superior response to the operation instruction (regarding the gate voltage and the exciting current) from the open and close control means 601 when compared with the response in the power source apparatus using the electromagnetic relay 52R and the diode 51*a*.

Further, because the control terminal (gate terminal) of the MOS FET 50' is completely and electrically insulated from other control terminals (the source and drain terminals) of the MOS FET 50' when the power source apparatus uses the MOS FET 50', it is necessary to have a high operation voltage, to be supplied to the control terminal (gate terminal), which is obtained by adding the voltage at the other terminals (source and drain terminals) and the control voltage. It requires a circuit to generate such a high operation voltage.

On the other hand, because the switch part 52*a* in the electromagnetic relay 52R is completely and electrically insulated from the electromagnetic coil 52*b* when the power source apparatus uses the electromagnetic relay 52R, instead of the MOS FET 50', this does not require any circuit to generate a high operation voltage. Because using the electromagnetic relay 52R does not require a high operation voltage, it is possible to avoid any high voltage generating circuit to generate the high operation voltage, and it is possible for the open and close control means 601 to perform a simple on-off control.

Fifteenth Embodiment

A description will be given of the power source apparatus according to the fifteenth embodiment of the present invention with reference to FIG. 21.

Figure 21:
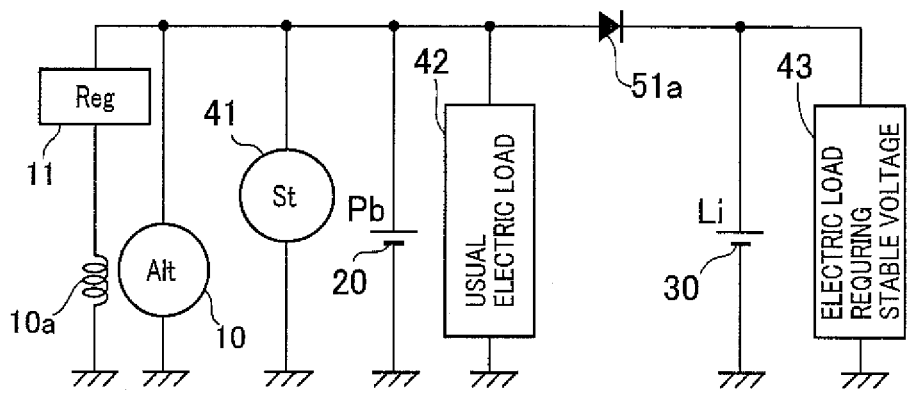
FIG. 21 is a block diagram showing a schematic electric circuit of a power source apparatus for vehicle according to a fifteenth embodiment of the present invention.

FIG. 21 is a block diagram showing a schematic electric circuit of an power source apparatus for vehicles according to the fifteenth embodiment.

The power source apparatus according to the fifteenth embodiment has the diode 51*a* (which serves as the rectifying means), but does not have the electromagnetic relay 52R (which serves as the open and close means). The diode 51*a* and the electromagnetic relay 52R are used in the power source apparatus according to the fourteenth embodiment.

The power source apparatus according to the fifteenth embodiment has the feature to shift the equal voltage point toward the lower limit side (Vds--->Vds') by the barrier voltage Vbar of the diode 51*a*, where the open circuit voltage of the lithium battery 30 is equal to the open circuit voltage of the lead-acid battery 20 at the agree point.

Further, because the direction of the diode 51*a* is placed in the forward direction, through which a current flows from the lead-acid battery 20 to the lithium battery 30, this structure makes it possible to prevent the current from flowing to the starter motor 41 from the lithium battery 30.

Because the current of the regenerative power flows into the lithium battery 30 through the diode 51*a* when the lithium battery 30 is charged with the regenerative power, the structure of the power source apparatus according to the fifteenth embodiment somewhat causes an energy loss.

(Other Modifications)

The present invention is not limited by the eighth to fifteenth embodiments previously described. It is possible to have the following structures or to selectively combine the structures of the eighth to fifteenth embodiments.

Although the eighth to thirteenth embodiments use the MOS FET 50' which serves as the open and close means to open and close the electric connection from the lithium battery 30 to the starter motor 41, it is possible to use a semiconductor switch (field effect transistor) such as IGBT, instead of the MOS FET 50', for example. Such a semiconductor switch has a superior response function and superior durability when compared with the MOS FETs 50'. In particular, because the current in the IGBT flows in the direction which is opposite to the forward direction of the parasitic diode, this requires an additional bypass means in order to decrease an energy loss caused by the barrier voltage of the parasitic diode. On the other hand, using the MOS FET 50' has a feature which does not require any additional bypass means.

Although each of the eighth to fifteenth embodiments uses the lithium battery 30 having the voltage characteristic A2 composed of non-aqueous electrolyte, it is possible to use a nickel battery composed of nickel compound, instead of using the lithium battery 30, unless it satisfies at least the conditions (a') to (c'), previously described.

In each of the eighth to fifteenth embodiments, the equal voltage point Vds' is present at the upper limit side from the lower limit value (10%) in the use range W2 (Li) of SOC of the lithium battery 30. However, the concept of the present invention is not limited by this. For example, it is possible to set the equal voltage point Vds' to the lower limit value.

In each of the eighth to fifteenth embodiments, the vehicles with the power source apparatus have the regenerative function. However, the concept of the present invention is not limited by this. For example, it is possible to apply the power source apparatus to vehicles without the regenerative function. By the way, because the vehicle having the regenerative function has a high frequency to charge the regenerative energy to the battery, it is possible to show the feature of the present invention to suppress the deterioration of the lead-acid battery 20 by reducing the accumulated charged-capacity in the lead-acid battery 20 with a low durability.

(Other Feature of the Present Invention)

In the power source apparatus as another aspect of the present invention, the open circuit voltage and the internal resistance of the lead-acid battery and the open circuit voltage and the internal resistance of the secondary battery are determined so that the open circuit voltage of the secondary battery is lower than the open circuit voltage of the lead-acid battery in the lower limit side from the equal voltage point in the use range of SOC of the secondary battery.

In the state where the secondary battery is charged rather than the charged capacity which is more than the capacity at the equal voltage point within the use range of SOC of the secondary battery, the secondary battery is preferentially charged rather than the lead-acid battery. When the residual capacity of the secondary battery drops after continuous discharge, there is a probability of causing overcharge of the secondary battery. In order to avoid the over discharge of the secondary battery, because the open circuit voltage of the secondary battery is lower than the open circuit voltage of the lead-acid battery in the lower limit side observed from the equal voltage point, the lead-acid battery starts to discharge the electric capacity when the residual capacity of the secondary battery becomes lower than that indicated by the equal voltage point, and the current flows from the lead-acid battery to the secondary battery to charge the secondary battery. This increases the residual capacity of the secondary battery to that designated by the equal voltage point, and it is thereby possible to prevent the secondary battery from overcharge.

In the power source apparatus as another aspect of the present invention, the open circuit voltage and the internal resistance of the lead-acid battery and the open circuit voltage and the internal resistance of the secondary battery are determined so that an upper limit side observed from the equal voltage point is wider than the lower limit side observed from the equal voltage point in the use range of SOC of the secondary battery.

The upper range from the equal voltage point is a range where the open circuit voltage of the secondary battery becomes higher than the open circuit voltage of the lead-acid battery (condition (b')). The more the range at the upper limit side is wide, the more the frequency to preferentially discharge the electric capacity from the secondary battery is increased rather than that from the lead-acid battery. This makes it possible to more suppress the deterioration of the lead-acid battery.

The power source apparatus as another aspect of the present invention further has a voltage drop suppression means which is capable of suppress discharging from the secondary battery to a starter motor mounted to the vehicle in order to suppress a voltage drop of the secondary battery.

In general, a starter motor requires a large electric power when the internal combustion engine starts to operate. The voltage of the battery rapidly drops when it supplies electric power to the starter motor. When the voltage of the battery becomes lower than the minimum operable voltage of the electric loads such as a navigation apparatus and an audio stereo system (which require a stable constant voltage), this can cause the electric loads such as a navigation system and an audio stereo apparatus to reset their operation.

In order to avoid this, the power source apparatus according to the present invention has the voltage drop suppression means which suppresses the discharge of the secondary battery to the starter motor and suppress the voltage drop of the secondary battery. This can avoid that the voltage of the electric power to be supplied to the starter motor becomes lower than the minimum operable voltage of the electric loads which require a stable constant voltage.

The power source apparatus as another aspect of the present invention further has a protection control means which is capable of protecting the secondary battery from overcharge by limiting a charging capacity into the secondary battery. The protection control means further protects the secondary battery from over discharge by limiting a discharging capacity from the secondary battery so that the residual capacity of the secondary battery is within the use range of the secondary battery. In the power source apparatus according to the present invention, the protection control means limits the charging capacity to the secondary battery or the discharging capacity from the secondary battery by using the voltage drop suppression means.

This makes it possible to prevent overcharge to the secondary battery and over discharge from the secondary battery during the time period other than the time to drive the starter motor by the voltage drop suppression means capable of suppressing the discharge from the secondary battery to the starter motor. For example, it is possible for the voltage drop suppression means to prevent the charging capacity to the secondary battery, and to avoid the overcharge of the secondary battery when the open circuit voltage of the secondary battery exceeds a threshold value.

In addition, it is possible for the voltage drop suppression means to decrease the discharging capacity from the secondary battery when the open circuit voltage of the secondary battery becomes below the threshold value.

The power source apparatus according to another aspect of the present invention further has a protection control means which is capable of protecting the secondary battery from overcharge by controlling a charge capacity into the secondary battery and so that the residual capacity of the secondary battery is within the use range of the secondary battery. In the power source apparatus, the protection control means outputs an instruction signal which instructs the constant voltage control means to decrease the set voltage in order to control the charge capacity to the secondary battery.

This makes it possible for the constant voltage control means to prevent the secondary battery from overcharge and over discharge. For example, it is possible to decrease the charging capacity to the secondary battery by supplying the instruction signal to the constant voltage control means in order to decrease the set voltage when the open circuit voltage of the secondary battery exceeds the threshold value.

In addition, it is possible to decrease the discharged capacity from the secondary battery by supplying the instruction signal to the constant voltage control means in order to increase the set voltage when the open circuit voltage of the secondary battery becomes below the threshold value.

In the power source apparatus as another aspect of the present invention, the voltage drop suppression means is a switch means to open and close an electric connection between the secondary battery and the starter motor, and the switch means opens the electric connection between the secondary battery and the starter motor when the lead-acid battery supplies the electric capacity to the starter motor.

Because this completely prevents the secondary battery from discharging to the starter motor, it is possible to avoid the voltage drop of the secondary battery when the starter motor starts to operation.

In the power source apparatus as another aspect of the present invention, the switch means is one of a manual switch, an electromagnetic relay, and a semiconductor switch.

In the power source apparatus as another aspect of the present invention, the secondary battery is a battery of non-aqueous electrolyte. This makes it possible to easily set the open circuit voltage and the internal resistance of the secondary battery with high energy density in order to satisfy the conditions (a), (b), and (c), previously described, when compared with the case of using a nickel battery.

In the power source apparatus as another aspect of the present invention, the secondary battery is comprised of a positive electrode made of positive electrode active material, a negative electrode made of negative electrode active material, and an electrolyte, and the negative electrode active material is made of one of carbon, graphite, lithium-doped carbon or graphite, lithium titanium oxide, silicon-containing alloy, and tin-containing alloy, and the positive electrode active material is lithium metal composite oxide and/or adsorbent material (for example, activated carbon) as the positive electrode.

Thus, in order to satisfy the conditions (a), (b), and (c), previously described, it is possible to easily set the open circuit voltage and the internal resistance of the secondary battery with high energy density by optimally selecting the positive electrode active material and the negative electrode active material capable of occluding and discharging lithium ions In the power source apparatus as another aspect of the present invention, the positive electrode active material is made of lithium iron phosphate. Thus, in order to satisfy the conditions (a), (b), and (c), previously described, it is possible to easily set the open circuit voltage and the internal resistance of the secondary battery having a high energy density by selecting and using lithium iron phosphate as the positive electrode active material in the secondary battery.

In the power source apparatus as another aspect of the present invention, the secondary battery is comprised of a plurality of battery cells electrically connected in series, and further comprising cell equalizing means capable of detecting a voltage of each of the battery cells and of equalizing a residual capacity of each of the battery cells based on the detected voltage of each of the battery cells.

When the secondary battery is charged and each of the battery cells has a different residual capacity, it would cause for the terminal voltage of the secondary battery to rapidly reach the set voltage. When reaching the set voltage, the battery cell having a high residual capacity exceeds the upper limit of the use range, and on the other hand, the battery cell having a less residual capacity does not reach the upper limit of the use range. This state promotes deterioration of the secondary battery.

Like the charging operation, when the secondary battery discharges and each of the battery cells has a different residual capacity, the battery cell having a less residual capacity becomes over discharge, and the battery cell having a high residual capacity falls to the state of not reaching the lower limit of the use range. Accordingly, this state also promotes deterioration of the secondary battery.

In the power source apparatus according to the present invention, the cell equalizing means monitors the voltage of each of the battery cells and equalizes the residual capacity of each of the battery cells. Accordingly, this can avoid the state in which the over charged battery cell and the battery cell having an extra ability to charge the capacity are simultaneously present when the secondary battery is charged. Similarly, this can also avoid the state in which the over discharged battery cell and the battery cell having an extra ability to charge the capacity are simultaneously present when the secondary battery is discharged. This makes it possible to more suppress the deterioration of the secondary battery.

The power source apparatus as another aspect of the present invention, further has an open and close means and an open and close control means. The open and close control means is connected in parallel to the rectifying means, and is capable of electrically connecting the alternator with the secondary battery and disconnecting the alternator from the secondary battery. The open and close control means instructs the open and close means to close the electrical connection between the alternator and the secondary battery when the secondary battery is charged with electric power generated by the alternator. In addition, the open and close control means instructs the open and close means to open the electrical connection between the alternator and the secondary battery when the rectifying means performs the rectifying operation.

When the power source apparatus does not have the open and close means, a thermal energy of energy loss (which corresponds to the power of "a barrier voltage×a current of generated power") occurs when the current of the generated power flows through the rectifying means when the current of the electric power generated in the alternator flows into the secondary battery to charge the secondary battery. In particular, when the alternator generates the electric power by the regenerative energy, a large current flows into the secondary battery, and the energy loss is thereby extremely increased.

In order to solve the above problem, because the open and close means starts to operate when the alternator supplies the electric energy to the secondary battery in order to charge the secondary battery, the current of the generated electric power flows into the secondary battery by bypassing the rectifying means. This can eliminate the energy loss caused by the barrier voltage in the rectifying means, it is possible to decrease the energy loss of the electric power generated by the alternator.

In a case other than the case to charge the secondary battery, because the open and close means is turned off, it is possible for the power source apparatus according to the present invention to have the following effects (X1) and (X2): (X1) the effect to expand the discharge area W2d' by shifting the equal voltage point Vds' toward the lower limit side which is achieved by the rectifying means; and (X2) the effect to prevent the current which flows from the secondary battery to the electric load which requires a large electric power such as a starter motor.

In the power source apparatus as another aspect of the present invention, the open and close means is composed of a semiconductor switch, and the rectifying means is composed of a parasitic diode of the semiconductor switch (see FIG. 11A, FIG. 11B, and FIG. 11C).

Further, In the power source apparatus as another aspect of the present invention, the open and close means is composed of an electromagnetic relay which is connected in parallel with the rectifying means (see FIG. 20).

That is, because the open and close means and the rectifying means are realized by using the single semiconductor electric part (semiconductor switch shown in FIG. 11A, FIG. 11B, and FIG. 11C), it is possible to decrease the total number of components and to reduce the entire size of the power source apparatus when compared with the case where the open and close means and the rectifying means are formed with different components.

Still further, it is possible to increase the response characteristic to the instruction to be transferred to the open and close means when compared with the case where the open and close means is composed of an electromagnetic relay.

However, when the open and close means is composed of such a semiconductor switch, because the control terminal of the semiconductor switch (for example, a gate terminal of a MOS FET) is completely and electrically insulated from other control terminals of the semiconductor switch (source and drain terminals of the MOS FET), it is necessary to have a high operation voltage, to be supplied to the control terminal (gate terminal), which is obtained by adding the voltage at the other terminals (source and drain terminals) and the control voltage. It requires a circuit to generate such a high operation voltage.

On the other hand, because the switch part of an electromagnetic relay is completely and electrically insulated from the electromagnetic coil when the power source apparatus uses the electromagnetic relay, instead of the semiconductor switch (such as a MOS FET), this does not require any circuit to generate a high operation voltage. Because using the electromagnetic relay does not require a high operation voltage, it is possible to avoid any high voltage generating circuit to generate the high operation voltage, and it is possible for the open and close control means to perform a simple on-off control.

It is preferable to use a MOS FET as the semiconductor based on the following reasons. That is, a MOS FET essentially has a parasitic diode therein. This parasitic diode serves as a rectifying means (see the parasitic diode 51 shown in FIG. 11A, FIG. 11B, and FIG. 11C, for example.) In other words, the internal circuit of the MOS FET is equivalent to the circuit composed of the open and close means (semiconductor switch part 52) and the rectifying means which are connected in parallel. Accordingly, incorporating the MOS FET with the power source apparatus makes it possible for the parasitic diode, which is always formed in the MOS FET, to serve as the rectifying means without any additional diode (as the rectifying means).

In the power source apparatus as another aspect of the present invention, the open circuit voltage and the internal resistance of the lead-acid battery and the open circuit voltage and the internal resistance of the secondary battery are determined so that the open circuit voltage of the secondary battery is lower than the subtracted voltage of the lead-acid battery at the lower limit side from the equal voltage point in the use range of SOC of the secondary battery, where the subtracted voltage of the lead-acid battery is obtained by subtracting the barrier voltage of the rectifying means from the open circuit voltage of the lead-acid battery.

As previously described, the secondary battery more discharges electric power rather than that from the lead-acid battery when the secondary battery is charged rather than the charged capacity at the equal voltage point in the use range of SOC of the secondary battery. When continuing the discharge, the secondary battery would enter the over discharge state.

According to the present invention, because the open circuit voltage of the secondary battery becomes lower than the subtracted voltage in the lower limit side from the equal voltage point, the lead-acid battery starts to discharge, and the current flows from the lead-acid battery to the secondary battery when the SOC of the secondary battery becomes lower than the voltage indicated by the equal voltage point, where the subtracted voltage is obtained by subtracting the barrier voltage from the open circuit voltage V0 (Pb) of the lead-acid battery. This can prevent the secondary battery from over discharge.

In the power source apparatus as another aspect of the present invention, the open circuit voltage and the internal resistance of the lead-acid battery and the open circuit voltage and the internal resistance of the secondary battery are determined so that a range at the upper limit side from the equal voltage point in the use range of SOC of the secondary battery is wider than a lower part at the lower limit side from the equal voltage point in the use range of SOC of the secondary battery.

The upper range from the equal voltage point is a range (which satisfies the condition (b), previously described) where the open circuit voltage of the secondary battery is higher than the subtracted voltage which is obtained by subtracting the barrier voltage from the open circuit voltage V0 (Pb) of the lead-acid battery. Therefore the more the upper range from the equal voltage point is expanded, the more the frequency to preferentially discharge from the secondary battery is increased. This makes it possible to increase the effect to suppress the deterioration of the lead-acid battery.

The power source apparatus as another aspect of the present invention further has the protection control means which is capable of protecting the secondary battery from overcharge by limiting a charging capacity to the secondary battery, and of protecting the secondary battery from over discharge by limiting a discharging capacity from the secondary battery so that the residual capacity of the secondary battery is within the use range of the secondary battery. In the power source apparatus, the protection control means limits the charging capacity to the secondary battery or the discharging capacity from the secondary battery by using the voltage drop suppression means.

For example, when the terminal voltage of the secondary battery becomes more than a threshold value during charging with the regenerative energy, turning off the open and close means can decreases the charging capacity to the secondary battery. This can prevent the secondary battery from overcharge. Further, when the open circuit voltage of the secondary battery becomes more than the threshold value by the overcharge when the charging is completed, because the open circuit voltage of the lead-acid battery is lower than the open circuit voltage of the secondary battery, turning on the open and close means can discharge from the secondary battery. Accordingly, it is possible to decrease the charging capacity to the secondary battery which is in the overcharge state, and this can prevent the secondary battery from overcharge.

When the open circuit voltage of the secondary battery becomes lower than the threshold value, the open circuit voltage is always lower than the subtracted voltage which is obtained by subtracting the barrier voltage from the open circuit voltage of the lead-acid battery. Performing the open and close means in addition to the charging to the secondary battery from the lead-acid battery through the rectifying means can increase the charging capacity from the lead-acid battery to the secondary battery and thereby prevent the secondary battery from over discharge.

The power source apparatus as another aspect of the present invention further has a protection control means which is capable of protecting the secondary battery from overcharge by controlling a charging capacity to the secondary battery and protecting the secondary battery from over discharge by controlling a discharging capacity from the secondary battery so that the residual capacity of the secondary battery is within the use range of the secondary battery. In the power source apparatus, the protection control means outputs an instruction signal which instructs the constant voltage control means to decrease the set voltage in order to control the charging capacity to the secondary battery.

It is possible to prevent the secondary battery from overcharge and over discharge by using the constant voltage control means. For example, when the open circuit voltage of the secondary battery becomes more than the threshold value, outputting the instruction signal to the constant voltage control means to decrease the set voltage can decrease the threshold value, and further suppress the secondary battery from overcharge.

In addition, when the open circuit voltage of the secondary battery becomes less than the threshold value, outputting the instruction signal to the constant voltage control means to increase the set voltage can increase the threshold value, and further suppress the secondary battery from over discharge.

In the power source apparatus as another aspect of the present invention, the secondary battery is a battery of non-aqueous electrolyte. This makes it possible for the secondary battery to have a high output power density and a high energy density, and to easily set the open circuit voltage and the internal resistance of the secondary battery in order to satisfy the conditions (a'), (b'), and (c'), when compared with the case using a nickel battery as the secondary battery.

In the power source apparatus as another aspect of the present invention, the secondary battery is comprised of a positive electrode made of positive electrode active material, a negative electrode made of negative electrode active material, and an electrolyte, the negative electrode active material is one of carbon, graphite, lithium-doped carbon or graphite, lithium titanium oxide, silicon-containing alloy, and tin-containing alloy, and the positive electrode active material is lithium metal composite oxide or activated carbon. Thus, selecting an optimum positive electrode active material and an optimum negative electrode active material to absorb and discharge lithium ions in the secondary battery can easily set the open circuit voltage and the internal resistance of the secondary battery in order to satisfy the conditions (a'), (b'), and (c'), previously described.

In the power source apparatus as another aspect of the present invention, the negative electrode active material is made of lithium titanium oxide. Selecting lithium titanium oxide as the negative electrode active material in the secondary battery can easily set the open circuit voltage and the internal resistance in order to satisfy the conditions (a'), (b'), and (c'), previously described.

Because the internal resistance of the positive electrode active material the following combination is larger than that of another active material, it must be required to somewhat increase the electrode area of the positive electrode in order to satisfy the conditions (a'), (b'), and (c'), previously described, where the combination is composed of lithium iron phosphate ($LiFePO_4$) as the positive electrode active material and graphite as the negative electrode active material.

We provide one improved combination of lithium titanium oxide as the negative electrode active material and an usually used positive electrode active material such as (lithium, lithium manganese oxide, and lithium nickelate compound. This combination, that is, using lithium titanium oxide as the negative electrode active material, makes it possible to reduce the electrode area, the size of the secondary battery, and the manufacturing cost while satisfying the conditions (a'), (b'), and (c'), previously described.

In the above viewpoint, the secondary battery in the power source apparatus according to the present invention uses lithium titanium oxide as the negative electrode active material. As described above, this makes it possible to downsize the secondary battery and to reduce the manufacturing cost of the power source apparatus because the electrode area of the secondary battery can be decreased.

Although the use of lithium titanium oxide as the negative electrode material in the secondary battery (lithium battery), when compared with using graphite, would cause a drawback to shift the equal voltage point Vds toward the upper limit side, where the open circuit voltage of the secondary battery is equal to the open circuit voltage of the lead-acid battery at the equal voltage point Vds. However, the structure of the power source apparatus according to the second aspect of the present invention can eliminate such a drawback because it has the MOS FET 50 capable of shifting the equal voltage point Vds toward the lower limit side (Vds--->Vds'). Accordingly, the poser source apparatus according to the second aspect of the present invention can solve the above drawback and also decrease the electrode area of the secondary battery (lithium battery).

In the power source apparatus as another aspect of the present invention, the secondary battery is comprised of a plurality of battery cells. Those battery cells are electrically connected in series. The power source apparatus as another aspect of the present invention further has a cell equalizing means capable of detecting a voltage of each of the battery cells and of equalizing a residual capacity of each of the battery cells based on the detected voltage of each of the battery cells.

When each of the battery cells has a different charged capacity, the terminal voltage of the secondary battery rapidly reaches the set voltage on a charging step. When the terminal voltage of the secondary battery reaches the set voltage, the battery cell having a high charged capacity before the charging step exceeds the capacity at the upper limit of the use range of SOC of the secondary battery, and on the other hand, a battery cell having a low charged capacity before the charging step does not reach (becomes less than) the upper limit when terminal voltage of the secondary battery reaches the set voltage. This promotes the deterioration of the secondary battery.

From the above viewpoint, the power source apparatus according to the second aspect of the present invention has the cell equalizing means which is capable of detecting a voltage of each of the battery cells and of equalizing a residual capacity of each of the battery cells based on the detected voltage of each of the battery cells. It is thereby possible to suppress avoid a mixing state of the battery cells of different charged capacities, overcharged and less charged battery cells, when the secondary battery is charged. Similarly, it is thereby possible to suppress a mixing state of the battery cells of different charged capacities when the secondary battery is discharged.

In the structure of the power source apparatus according to the present invention, the secondary battery supplies the electric power to the electric loads which require a stable constant voltage or a stable voltage which is fluctuated within the predetermined voltage range. The rectifying means or the open and close means prevent the electric connection between the secondary battery with the starter motor which required a large electric power when it starts to operate in order to avoid the rapid voltage drop in the secondary battery.

In general, the starter motor requires a large electric power rather than other electric loads mounted to vehicles. When the battery supplies such a large electric power to the starter motor when the starter motor starts to operate, the terminal voltage of the battery rapidly drops. When the battery supplies the decreased voltage of the electric power voltage, after supplying a large electric power to the starter motor, to usual electrical loads such as a defroster heater for a rear window, it would reset the operation of the usual electric loads such as the navigation system and/or the audio system. This would cause various problems in operation. In order to avoid this, the power source apparatus according to the present invention can avoid the secondary battery discharging to the starter motor in order to avoid any rapid voltage drop in the secondary battery and to supply a stable voltage to the usual electric loads such as the navigation system and the audio system.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A power source apparatus, which is mounted to a vehicle, comprising:
    an alternator;
    a constant voltage control section configured to maintain a voltage of electric power generated by the alternator at a set voltage;
    a lead-acid battery electrically connected to the alternator;
    a secondary battery, electrically connected in parallel to the lead-acid battery, having an energy density which is higher than an energy density of the lead-acid battery, the secondary battery being a non-aqueous electrolyte type composed of positive electrode active material and negative electrode active material, the positive electrode active material being made of lithium metal composite oxide, and the negative electrode active material being made of one selected from lithium titanium oxide, carbon, graphite, alloy containing silicon, and alloy containing tin;
    a protection control section configured to protect the secondary battery from overcharge by controlling a charging capacity into the secondary battery and to protect the secondary battery from over discharge by controlling a discharging capacity from the secondary battery so that a residual capacity of the secondary battery becomes within a range of 10% to 90% of a state of charge (SOC) of the secondary battery, and the protection control section outputs to the constant voltage control section an instruction signal which instructs the constant voltage control section to reduce the set voltage in order to control the charging capacity to the secondary battery; and
    an open and close section, arranged between the lead-acid battery and the secondary battery, configured to electrically disconnect the secondary battery from a starter motor mounted on the vehicle in order to prevent a voltage drop of the secondary battery during an engine restart of the vehicle, and an electrical load requiring a constant voltage is electrically connected to the open and close section at the side of the secondary battery,
    wherein an open circuit voltage and an internal resistance of the lead-acid battery and an open circuit voltage and an internal resistance of the secondary battery are determined in order to satisfy the following conditions (a), (b), and (c):
      (a) an equal voltage point, at which the open circuit voltage of the lead-acid battery becomes equal to the open circuit voltage of the secondary battery, is present within a range of 88% to 100% of a state of charge (SOC) of the lead-acid battery and within the range of 10% to 90% of the SOC of the secondary battery;
      (b) the open circuit voltage of the secondary battery is higher than the open circuit voltage of the lead-acid battery at an upper limit side from the equal voltage point within the range of 10% to 90% of the SOC of the secondary battery; and
      (c) a terminal voltage of the secondary battery when a maximum charging current flows in the secondary battery is not more than the set voltage which is set by the constant voltage control section, and
    wherein, when the engine restarts, the protection control section instructs the open and close section to disconnect the starter motor from the secondary battery and the electrical load in order to stably supply the constant voltage to the electrical load.

2. The power source apparatus according to claim 1, further comprising voltage drop suppression section configured to suppress discharge from the secondary battery to a starter motor mounted to the vehicle in order to suppress a voltage drop of the secondary battery.

3. The power source apparatus according to claim 2, wherein the protection control section further protects the secondary battery from over discharge by limiting a discharging capacity of the secondary battery so that the residual capacity of the secondary battery is within the range of the SOC of the secondary battery, wherein the protection control section limits the charging capacity to the secondary battery or the discharging capacity from the secondary battery by using the voltage drop suppression section.

4. The power source apparatus according to claim 2, wherein the voltage drop suppression section is a switch means to open and close an electric connection between the secondary battery and the starter motor, and a switch section opens the electric connection between the secondary battery and the starter motor when the lead-acid battery supplies the electric capacity to the starter motor.

5. The power source apparatus according to claim 4, wherein the switch section is one of a manual switch, an electromagnetic relay, and a semiconductor switch.

6. A power source apparatus, which is mounted to a vehicle, comprising:
    an alternator;
    a constant voltage control section configured to adjust a voltage of electric power generated by the alternator to a set voltage;
    a lead-acid battery electrically connected to the alternator;
    a secondary battery, electrically connected in parallel to the lead-acid battery, having an energy density that is higher than an energy density of the lead-acid battery, the secondary battery being a non-aqueous electrolyte type composed of positive electrode active material and negative electrode active material, the positive electrode active material being made of lithium metal composite oxide, and the negative electrode active material being made of one selected from lithium titanium oxide, carbon, graphite, alloy containing silicon, and alloy containing tin;
    a rectifying section placed between the lead-acid battery and the secondary battery so that a forward current direction of the rectifying section becomes a direction from the lead-acid battery to the secondary battery, and the rectifying section having a barrier voltage to the current flowing in the forward direction through the rectifying section;
    an open and close section, connected in parallel to the rectifying section, configured to electrically connect the alternator with the secondary battery and disconnect the alternator from the secondary battery;
    an open and close control section configured to (i) instruct the open and close section to close the electrical connection between the alternator and the secondary battery when the secondary battery is charged with electric power generated by the alternator, and (ii) instruct the open and close section to open the electrical connection between the alternator and the secondary battery when the rectifying section performs the rectifying operation; and a protection control section configured to protect the secondary battery from overcharge by controlling a charging capacity to the secondary battery and to protect the secondary battery from over discharge by controlling a discharging capacity from the secondary battery so that a residual capacity of the secondary battery becomes within a range of 10% to 90% of a state of charge (SOC) of the secondary battery, and the protection control section outputs, to the constant voltage control section, an instruction signal which instructs the constant voltage control section to reduce the set voltage in order to control the charging capacity to the secondary battery, wherein an open circuit voltage and an internal resistance of the lead-acid battery and an open circuit voltage and an internal resistance of the secondary battery are determined in order to satisfy the following conditions (a'), (b'), and (C'):

(a') an equal voltage point, at which the open circuit voltage of the secondary battery is equal to a subtracted voltage obtained by subtracting the barrier voltage of the rectifying section from the open circuit voltage of the lead-acid battery, is present within a range of 88% to 100% of a state of charge (SOC) of the lead-acid battery and within the range of 10% to 90% of the SOC of the secondary battery;

(b') the open circuit voltage of the secondary battery is higher than the subtracted voltage of the lead-acid battery at an upper limit side from the equal voltage point within the range of 10% to 90% of the SOC of the secondary battery; and (c') a terminal voltage of the secondary battery when a maximum charging current flows in the secondary battery is not more than the set voltage which is set by the constant voltage control section, and wherein, when an engine of the vehicle restarts, the protection control section instructs the open and close section to disconnect the starter motor from the secondary battery and the electrical load in order to stably supply the constant voltage to the electrical load.

7. The power source apparatus according to claim 6, wherein the open and close section is composed of a semiconductor switch, and the rectifying section is composed of a parasitic diode of the semiconductor switch.

8. The power source apparatus according to claim 6, wherein the open and close section is composed of an electromagnetic relay which is connected in parallel to the rectifying section.

* * * * *